US008543365B1

(12) United States Patent
Petro et al.

(10) Patent No.: US 8,543,365 B1
(45) Date of Patent: Sep. 24, 2013

(54) COMPUTER-READABLE MEDIUM, A METHOD AND AN APPARATUS FOR DESIGNING AND SIMULATING ELECTRODYNAMIC MACHINES IMPLEMENTING CONICAL AND CYLINDRICAL MAGNETS

(75) Inventors: John Patrick Petro, Los Altos, CA (US); Ken George Wasson, Foster City, CA (US)

(73) Assignee: Novatorque, Inc., Fremont, CA (US)

( * ) Notice: Subject to any disclaimer, the term of this patent is extended or adjusted under 35 U.S.C. 154(b) by 1471 days.

(21) Appl. No.: 11/707,285

(22) Filed: Feb. 12, 2007

Related U.S. Application Data

(63) Continuation-in-part of application No. 11/255,404, filed on Oct. 20, 2005, now Pat. No. 7,294,948.

(60) Provisional application No. 60/622,258, filed on Oct. 25, 2004, provisional application No. 60/773,750, filed on Feb. 14, 2006, provisional application No. 60/724,055, filed on Oct. 5, 2005, provisional application No. 60/773,500, filed on Feb. 14, 2006.

(51) Int. Cl.
*G06G 7/62* (2006.01)
*G06F 17/50* (2006.01)
(52) U.S. Cl.
USPC .............................................. 703/13; 703/1
(58) Field of Classification Search
USPC ......................................................... 703/1, 13
See application file for complete search history.

(56) References Cited

U.S. PATENT DOCUMENTS

| 414,659 | A | 11/1889 | Seafert |
| 422,862 | A | 3/1890 | Washburn |
| 439,102 | A | 10/1890 | Bradley |
| 754,066 | A | 3/1904 | Hoffman |
| 829,975 | A | 9/1906 | Lincoln |
| 846,079 | A | 3/1907 | Yost |
| 1,039,197 | A | 9/1912 | Roth et al. |
| 1,557,213 | A | 10/1925 | Lee |
| 1,640,742 | A | 8/1927 | Wallace et al. |
| 1,763,104 | A | 6/1930 | Shurtleff |
| 1,771,281 | A | 7/1930 | Wilsing |

(Continued)

FOREIGN PATENT DOCUMENTS

| CH | 400323 | 4/1966 |
| DE | 3742502 A1 | 12/1987 |

(Continued)

OTHER PUBLICATIONS

Industrial Circuits Application Note, "Stepper Motor Basics", p. 1-6, 1998, available at http://www.solarbotics.net/library/pdflib/pdf/motorbas.pdf.*

(Continued)

*Primary Examiner* — Suzanne Lo
(74) *Attorney, Agent, or Firm* — Cooley LLP

(57) ABSTRACT

A method, apparatus, system and computer-readable medium for designing and/or simulating electrodynamic machinery are disclosed to, among other things, optimize one or more performance characteristics by manipulating structural and/or functional characteristics of the constituent components of an electrodynamic machine. According to the various embodiments, a motor designer can create a new motor design by modeling a rotor-stator structure to design and/or simulate electrodynamic machines that implement, for example, conically shaped magnets and accompanying field pole members.

28 Claims, 14 Drawing Sheets

(56) References Cited

U.S. PATENT DOCUMENTS

| | | |
|---|---|---|
| 1,874,094 A | 8/1932 | Ford et al. |
| 1,962,832 A | 6/1934 | Neureuther |
| 2,025,560 A | 12/1935 | Warren |
| 2,059,518 A | 11/1936 | Harley |
| 2,081,993 A | 6/1937 | Gebhardt et al. |
| 2,141,681 A | 12/1938 | Brueck |
| 2,378,668 A | 6/1945 | Vickers |
| 2,480,825 A | 9/1949 | Adolph |
| 2,484,001 A | 10/1949 | Raymond |
| 2,486,656 A | 11/1949 | Klinkhamer |
| 2,500,730 A | 3/1950 | Yonkers |
| 2,513,226 A | 6/1950 | Wylie |
| 2,513,227 A | 6/1950 | Wylie |
| 2,561,890 A | 7/1951 | Stoddard |
| 2,575,153 A | 11/1951 | Wightman |
| 2,669,687 A | 2/1954 | De Tastes |
| 2,677,256 A | 5/1954 | Donandt |
| 2,677,259 A | 5/1954 | Woodward |
| 2,694,781 A | 11/1954 | Hinz |
| 2,717,969 A | 9/1955 | Buchhold et al. |
| 2,769,106 A | 10/1956 | Dembowski |
| 2,796,542 A | 6/1957 | Bekey et al. |
| 2,802,959 A | 8/1957 | Powers |
| 2,824,272 A | 2/1958 | Delaporte |
| 2,927,229 A | 3/1960 | Merrill |
| 3,001,093 A | 9/1961 | Wilcox et al. |
| 3,025,445 A | 3/1962 | Welch |
| 3,083,310 A | 3/1963 | Tweedy |
| 3,111,596 A | 11/1963 | Lovegrove |
| 3,153,157 A | 10/1964 | Rabe |
| 3,173,042 A | 3/1965 | Fodor |
| 3,175,111 A | 3/1965 | Orr |
| 3,205,384 A | 9/1965 | Sears |
| 3,210,582 A | 10/1965 | Miller |
| 3,223,866 A | 12/1965 | Tiltins |
| 3,241,111 A | 3/1966 | Sandstrom |
| 3,241,304 A | 3/1966 | Mattingly |
| 3,277,324 A | 10/1966 | Beauddin et al. |
| 3,309,547 A | 3/1967 | Woodward |
| 3,319,100 A | 5/1967 | Erickson |
| 3,321,652 A | 5/1967 | Opel |
| 3,344,325 A | 9/1967 | Sklaroff |
| 3,356,425 A | 12/1967 | Carriere et al. |
| 3,360,667 A | 12/1967 | Gordon |
| 3,374,376 A | 3/1968 | Kromrey |
| 3,396,291 A | 8/1968 | Somerville |
| 3,399,002 A | 8/1968 | Atkinson |
| 3,428,837 A | 2/1969 | Morreale et al. |
| 3,466,518 A | 9/1969 | Aylikci |
| 3,471,729 A | 10/1969 | Latta et al. |
| 3,482,131 A | 10/1969 | Lytle |
| 3,490,816 A | 1/1970 | Lyman |
| 3,513,341 A | 5/1970 | Gratzmuller |
| 3,519,859 A | 7/1970 | Morreale et al. |
| 3,529,191 A | 9/1970 | Henry-Baudot |
| 3,555,324 A | 1/1971 | Lovegrove |
| 3,565,495 A | 2/1971 | Lyman |
| 3,603,826 A | 9/1971 | Saretzky |
| 3,619,014 A | 11/1971 | Quick |
| 3,628,239 A | 12/1971 | Hunt et al. |
| 3,648,090 A | 3/1972 | Voin |
| 3,651,355 A | 3/1972 | Mason |
| 3,663,851 A | 5/1972 | Persson |
| 3,689,787 A | 9/1972 | Saretzky |
| 3,717,780 A | 2/1973 | Hohne, Jr. et al. |
| 3,723,796 A | 3/1973 | Mason |
| 3,787,100 A | 1/1974 | Habermann et al. |
| 3,819,964 A | 6/1974 | Noodleman |
| 3,822,768 A | 7/1974 | Sebulke |
| 3,836,802 A | 9/1974 | Parker |
| 3,863,084 A | 1/1975 | Hasebe |
| 3,876,892 A | 4/1975 | Noodleman |
| 3,886,387 A | 5/1975 | Graham et al. |
| 3,892,987 A | 7/1975 | Noodleman |
| 3,936,680 A | 2/1976 | Kuwako et al. |
| 3,937,993 A | 2/1976 | Noodleman |
| 3,947,155 A | 3/1976 | Bidol |
| 3,950,663 A | 4/1976 | Mead |
| 3,956,651 A | 5/1976 | Brammerlo |
| 3,979,821 A | 9/1976 | Noodleman |
| 3,991,331 A | 11/1976 | Noodleman |
| 4,031,421 A | 6/1977 | Geiger |
| 4,043,614 A | 8/1977 | Lyman |
| 4,045,696 A * | 8/1977 | Lutz et al. .................. 310/49.43 |
| 4,047,807 A | 9/1977 | Okano |
| 4,066,922 A | 1/1978 | Hennemann et al. |
| 4,072,881 A | 2/1978 | Ban |
| 4,080,724 A | 3/1978 | Gillette |
| 4,117,359 A | 9/1978 | Wehde |
| 4,143,289 A | 3/1979 | Williams |
| 4,152,570 A | 5/1979 | Inoue et al. |
| 4,153,851 A | 5/1979 | Hovorka |
| 4,156,817 A | 5/1979 | Preece et al. |
| 4,159,434 A | 6/1979 | Kalsi |
| D256,351 S | 8/1980 | Schulze |
| 4,216,263 A | 8/1980 | Otis et al. |
| 4,221,984 A | 9/1980 | Mason |
| 4,225,798 A | 9/1980 | Barrett |
| 4,259,603 A | 3/1981 | Uchiyama et al. |
| 4,307,310 A | 12/1981 | Wedman et al. |
| 4,310,768 A | 1/1982 | Colley |
| 4,321,495 A | 3/1982 | Kennedy |
| 4,327,302 A | 4/1982 | Hershberger |
| 4,328,411 A | 5/1982 | Haller et al. |
| 4,358,693 A | 11/1982 | Palmer et al. |
| 4,363,988 A | 12/1982 | Kliman |
| 4,378,146 A | 3/1983 | Suzuki et al. |
| 4,390,262 A | 6/1983 | Hirohata et al. |
| 4,395,815 A | 8/1983 | Stanley et al. |
| 4,438,570 A | 3/1984 | Dokoupil |
| 4,460,253 A | 7/1984 | Kawai et al. |
| 4,476,395 A | 10/1984 | Cronin |
| 4,480,208 A | 10/1984 | Logie et al. |
| 4,483,570 A | 11/1984 | Inoue |
| 4,491,401 A | 1/1985 | Inaba et al. |
| 4,503,349 A | 3/1985 | Miller |
| 4,543,506 A | 9/1985 | Kawada et al. |
| 4,564,775 A | 1/1986 | Mazzorana |
| 4,577,129 A | 3/1986 | Bertram |
| 4,593,222 A | 6/1986 | Burkel et al. |
| 4,594,539 A | 6/1986 | Michelson |
| 4,601,564 A | 7/1986 | Yamamoto |
| 4,614,888 A | 9/1986 | Mosher et al. |
| 4,628,220 A | 12/1986 | Flogvall |
| 4,631,807 A | 12/1986 | Kawada et al. |
| 4,658,228 A | 4/1987 | Leupold |
| 4,663,581 A | 5/1987 | Glennon |
| 4,674,178 A | 6/1987 | Patel |
| 4,710,667 A | 12/1987 | Whiteley |
| 4,713,569 A | 12/1987 | Schwartz |
| 4,725,750 A | 2/1988 | Welch |
| 4,731,626 A | 3/1988 | Kawamoto |
| 4,734,604 A | 3/1988 | Sontheimer et al. |
| 4,741,094 A | 5/1988 | Denk et al. |
| 4,745,345 A | 5/1988 | Petersen |
| 4,748,359 A | 5/1988 | Yahara et al. |
| 4,748,361 A | 5/1988 | Ohnishi et al. |
| 4,757,224 A | 7/1988 | McGee et al. |
| 4,759,186 A | 7/1988 | Sugden |
| 4,760,314 A | 7/1988 | Mohri et al. |
| 4,763,150 A | 8/1988 | Sumi |
| 4,777,397 A | 10/1988 | Parshall |
| 4,788,369 A | 11/1988 | Marsh et al. |
| 4,788,465 A | 11/1988 | Hertrich |
| 4,802,347 A | 2/1989 | Nystuen |
| 4,879,484 A | 11/1989 | Huss |
| 4,883,996 A | 11/1989 | Aoki |
| 4,885,489 A | 12/1989 | Stuhr |
| 4,908,347 A | 3/1990 | Denk |
| 4,918,802 A | 4/1990 | Schaefer |
| 4,920,295 A | 4/1990 | Holden et al. |
| 4,939,397 A | 7/1990 | Morrill |
| 4,949,000 A | 8/1990 | Petersen |
| 4,962,583 A | 10/1990 | Yang |

| | | |
|---|---|---|
| 4,983,870 A | 1/1991 | McSparran |
| 4,984,972 A | 1/1991 | Clausen et al. |
| 5,033,265 A | 7/1991 | Sugden |
| 5,036,235 A | 7/1991 | Kleckner |
| 5,045,741 A | 9/1991 | Dvorsky |
| 5,047,682 A | 9/1991 | Burgbacher |
| 5,049,771 A | 9/1991 | Challita et al. |
| 5,081,387 A | 1/1992 | Nystuen |
| 5,091,668 A | 2/1992 | Cuenot et al. |
| 5,130,592 A | 7/1992 | Bitsch et al. |
| 5,140,211 A | 8/1992 | Ucida |
| 5,140,212 A | 8/1992 | Iwasaki et al. |
| 5,157,297 A | 10/1992 | Uchida |
| 5,168,187 A | 12/1992 | Baer et al. |
| 5,191,256 A | 3/1993 | Reiter, Jr. et al. |
| 5,200,662 A | 4/1993 | Tagami et al. |
| 5,204,572 A | 4/1993 | Ferreira |
| 5,212,418 A | 5/1993 | Mason |
| 5,216,308 A | 6/1993 | Meeks |
| 5,233,254 A | 8/1993 | Fisher et al. |
| 5,237,229 A | 8/1993 | Ohishi |
| 5,258,677 A | 11/1993 | Mason |
| 5,283,492 A | 2/1994 | Mason |
| 5,300,848 A | 4/1994 | Huss et al. |
| 5,386,161 A | 1/1995 | Sakamoto |
| 5,406,157 A | 4/1995 | New |
| 5,436,518 A | 7/1995 | Kawai |
| 5,463,262 A | 10/1995 | Uchida |
| 5,486,730 A | 1/1996 | Ludwig et al. |
| 5,514,924 A | 5/1996 | McMullen et al. |
| 5,536,985 A | 7/1996 | Ward et al. |
| 5,610,460 A | 3/1997 | Jacobson et al. |
| 5,627,419 A | 5/1997 | Miller |
| 5,642,009 A | 6/1997 | McCleer et al. |
| 5,656,880 A | 8/1997 | Clark |
| 5,659,317 A | 8/1997 | Toyama et al. |
| 5,674,169 A | 10/1997 | Yang |
| 5,731,641 A | 3/1998 | Botos et al. |
| 5,744,887 A | 4/1998 | Itoh |
| 5,751,086 A | 5/1998 | Taghezout |
| 5,753,989 A | 5/1998 | Syverson et al. |
| 5,767,597 A | 6/1998 | Gondhalekar |
| 5,777,421 A | 7/1998 | Woodward, Jr. |
| 5,780,950 A | 7/1998 | Yang |
| 5,789,841 A | 8/1998 | Wang |
| 5,844,345 A | 12/1998 | Hsu |
| 5,955,806 A | 9/1999 | Devenyi |
| 5,955,811 A | 9/1999 | Chiba et al. |
| 5,962,948 A | 10/1999 | Hakala et al. |
| 6,013,693 A | 1/2000 | Takahashi et al. |
| 6,025,769 A | 2/2000 | Chu et al. |
| 6,049,148 A | 4/2000 | Nichols et al. |
| 6,057,613 A | 5/2000 | Trago |
| 6,104,115 A | 8/2000 | Offringa et al. |
| 6,114,788 A | 9/2000 | Vuillemin et al. |
| 6,157,109 A | 12/2000 | Schiferl et al. |
| 6,177,746 B1 | 1/2001 | Tupper et al. |
| 6,188,159 B1 | 2/2001 | Fan |
| 6,194,797 B1 | 2/2001 | Simon et al. |
| 6,236,124 B1 | 5/2001 | Sekiyama et al. |
| 6,246,146 B1 | 6/2001 | Schiller |
| 6,346,755 B1 | 2/2002 | Tong et al. |
| 6,359,357 B1 | 3/2002 | Blumenstock |
| 6,417,596 B1 | 7/2002 | Schurter et al. |
| 6,437,474 B1 | 8/2002 | Chu |
| 6,455,975 B1 | 9/2002 | Raad et al. |
| 6,492,751 B1 | 12/2002 | Ineson et al. |
| 6,492,753 B2 | 12/2002 | Zepp et al. |
| 6,590,312 B1 | 7/2003 | Seguchi et al. |
| 6,700,280 B1 | 3/2004 | Geiger et al. |
| 6,707,209 B2 | 3/2004 | Crapo et al. |
| 6,707,221 B2 | 3/2004 | Carl |
| 6,707,224 B1 | 3/2004 | Petersen |
| 6,720,688 B1 | 4/2004 | Schiller |
| 6,745,972 B2 | 6/2004 | Takano et al. |
| 6,784,582 B1 | 8/2004 | Kolomeitsev et al. |
| 6,836,388 B2 | 12/2004 | Nishimura et al. |
| 6,844,656 B1 | 1/2005 | Larsen et al. |
| 6,889,419 B2 | 5/2005 | Reiter, Jr. et al. |
| 6,897,596 B2 | 5/2005 | Laing |
| 6,903,471 B2 | 6/2005 | Arimitsu et al. |
| 6,952,064 B2 | 10/2005 | Hiwaki et al. |
| 7,061,152 B2 | 6/2006 | Petro et al. |
| 7,105,974 B2 | 9/2006 | Nashiki |
| 7,135,800 B2 | 11/2006 | Yamada et al. |
| 7,205,693 B2 | 4/2007 | Petro et al. |
| 7,239,058 B2 | 7/2007 | Petro et al. |
| 7,294,948 B2 | 11/2007 | Wasson et al. |
| 7,474,027 B2 * | 1/2009 | Kikuchi et al. .......... 310/156.53 |
| 7,719,159 B2 | 5/2010 | Petro et al. |
| 7,884,522 B1 | 2/2011 | Petro et al. |
| 7,982,350 B2 | 7/2011 | Burch et al. |
| 7,982,352 B2 | 7/2011 | Nymann et al. |
| 8,072,106 B2 | 12/2011 | Petro et al. |
| 8,072,113 B2 | 12/2011 | Burch et al. |
| 8,072,115 B2 | 12/2011 | Burch et al. |
| 2002/0047426 A1 | 4/2002 | Pop, Sr. |
| 2002/0192103 A1 | 12/2002 | Barber et al. |
| 2003/0051614 A1 | 3/2003 | Knoth et al. |
| 2003/0062792 A1 | 4/2003 | Reiter, Jr. et al. |
| 2003/0067236 A1 | 4/2003 | Takahata et al. |
| 2003/0102769 A1 | 6/2003 | Calley |
| 2003/0214194 A1 | 11/2003 | Carl, Jr. et al. |
| 2004/0004407 A1 | 1/2004 | Laurent et al. |
| 2004/0119371 A1 | 6/2004 | Laing |
| 2004/0155547 A1 | 8/2004 | Islam et al. |
| 2004/0232800 A1 | 11/2004 | Seguchi et al. |
| 2005/0017591 A1 | 1/2005 | Brewster et al. |
| 2005/0088052 A1 | 4/2005 | Ionel et al. |
| 2005/0264118 A1 | 12/2005 | Kascak et al. |
| 2006/0001328 A1 | 1/2006 | Rau et al. |
| 2006/0028093 A1 | 2/2006 | Minagawa et al. |
| 2006/0087186 A1 | 4/2006 | Wasson et al. |
| 2006/0131976 A1 | 6/2006 | Kikuchi et al. |
| 2006/0152099 A1 | 7/2006 | Petro et al. |
| 2006/0238053 A1 | 10/2006 | Kascak et al. |
| 2007/0085442 A1 | 4/2007 | Petro et al. |
| 2007/0197899 A1 | 8/2007 | Ritter et al. |
| 2007/0205675 A1 | 9/2007 | Petro et al. |
| 2008/0278022 A1 | 11/2008 | Burch et al. |

FOREIGN PATENT DOCUMENTS

| | | |
|---|---|---|
| DE | - 4223836 | 1/1994 |
| DE | 19954196 A1 | 11/1999 |
| DE | 10140362 A1 | 3/2003 |
| EP | 0208124 A2 | 1/1987 |
| EP | 0251350 A2 | 1/1988 |
| GB | 960879 | 6/1964 |
| JP | 60-66658 | 4/1985 |
| JP | 04-026350 | 1/1992 |
| JP | 06-014521 | 1/1994 |
| JP | 06-141527 | 5/1994 |
| JP | 06-351212 | 12/1994 |
| JP | 08-080019 | 3/1996 |
| JP | 10-174399 | 6/1998 |
| JP | 10-174400 | 6/1998 |

OTHER PUBLICATIONS

Industrial Circuits Application Note, "Drive Circuit Basics", pp. 1-7, 1998, available at http://www.solarbotics.net/library/pdflib/pdf/drive.pdf.*

Beauchemin, George A. "A Practical Use of the Motor Constant Km" DC Motor/Generator Technical Note, 2002, 11 pages. Available at http://www.dmicrotek.com/servlet/com.itmr.waw.servlet.FileViewer?sprachid=1&kid=128948&fid=133820&kdid=541255.*

Lin et al. "A Fully Integrated Simulation Package for Electric Machine Design", 2000, 7 pages, available at http://www.docstoc.com/docs/27650572/A-Fully-Integrated-Simulation-Package-for-Electric-Machine-Design.*

Fu et al. "Modeling of Solid Conductors in Two-Dimensional Transient Finite-Element Analysis and Its Application to Electric Machines", Mar. 2004, IEEE Transactions on Magnetics, vol. 40, No. 2, pp. 426-434.*

Lee W. Young; Notification of Transmittal of the International Search Report and the Written Opinion of the International Searching Authority, or the Declaration; International Application No. PCT/US 08/66072; Date of Mailing Aug. 18, 2008; Form PCT/ISA/220; 1 page.

Lee W. Young; International Search Report; International Application No. PCT/US 08/66072; Date of Mailing Aug. 18, 2008; Form PCT/ISA/210; 2 pages.

Lee W. Young; Written Opinion of the International Searching Authority; International Application No. PCT/US 08/66072 Date of Mailing Aug. 18, 2008; Form PCT/ISA/237; 4 pages.

USPTO Office Action in U.S. Appl. No. 11/707,817, mailed Sep. 27, 2010.

USPTO Office Action in U.S. Appl. No. 12/080,788, mailed Sep. 8, 2010.

USPTO Office Action in U.S. Appl. No. 11/707,817, mailed Apr. 16, 2010.

USPTO Office Action in U.S. Appl. No. 11/925,661, mailed Mar. 30, 2010.

USPTO Office Action in U.S. Appl. No. 11/707,817, mailed Nov. 5, 2009.

Young, Lee W. Notification of Transmittal of the International Search Report and the Written Opinion of the International Searching Authority, or the Declaration, Patent Cooperation Treaty, Feb. 15, 2008, International Application No. PCT/US 07/03734.

* cited by examiner

COMPUTER-READABLE MEDIUM, A METHOD AND AN APPARATUS FOR DESIGNING AND SIMULATING ELECTRODYNAMIC MACHINES IMPLEMENTING CONICAL AND CYLINDRICAL MAGNETS

CROSS REFERENCE TO RELATED APPLICATION

This application is a Continuation-in-Part of U.S. Nonprovisional application Ser. No. 11/255,404, filed on Oct. 20, 2005, which claims priority to U.S. Provisional Application No. 60/622,258, filed on Oct. 25, 2004, all of which are herein incorporated by reference. This application also claims the benefit of U.S. Provisional Application No. 60/773,750, entitled "Design and Simulation of Electrodynamic Machines Implementing Conical Magnets," filed on Feb. 14, 2006, the disclosure of which is incorporated by reference. This application also incorporates by reference the following in their entirety: (1.) U.S. Pat. No. 7,061,122 B2, entitled "Rotor-Stator Structure for Electrodynamic Machines," issued on Jun. 13, 2006, (2.) U.S. Provisional Application No. 60/724,055, entitled "Commutation of Brushless Electrodynamic Machines," and filed on Oct. 5, 2005; (3.) U.S. Provisional Application No. 60/773,500, entitled "Field Pole Member for Electrodynamic Machines," and filed on Feb. 14, 2006, (4.) U.S. Nonprovisional application Ser. No. 11/543,521, entitled "Motor Modules for Linear and Rotary Motors" and filed on Oct. 4, 2006, and (5.) U.S. Nonprovisional application Ser. No. 11/707,817, entitled "Field Pole Members for Electrodynamic Machines and Methods of Forming Same" and filed on Feb. 12, 2007.

BRIEF DESCRIPTION OF THE INVENTION

Embodiments of the invention relate generally to electric motors, alternators, generators and the like, and more particularly, to an apparatus, a method, and a computer-readable medium for modeling a rotor-stator structure to design and/or simulate electrodynamic machines.

BACKGROUND OF THE INVENTION

Traditional techniques for designing and simulating conventional motors, while functional, do not readily facilitate the effective development and production of all types of electrodynamic machines. For example, current techniques for designing and simulating conventional motors are not generally well suited to design and to simulate motors having specific permanent magnet configurations and/or field pole configurations.

In view of the foregoing, it would be desirable to provide structures, methods and computer-readable media for reducing the drawbacks commonly associated with designing and simulating conventional electric motors and generators, and to further provide a motor designer with methods for optimizing performance of electrodynamic machines that implement, for example, conical magnets.

SUMMARY OF THE INVENTION

A method, apparatus, system and computer readable medium for designing and/or simulating electrodynamic machinery are disclosed to, among other things, optimize one or more performance characteristics by manipulating structural and/or functional characteristics of the constituent components of an electrodynamic machine. According to the various embodiments, a motor designer can create a motor design using, for example, computer-modeled rotor-stator structures implementing, for example, conically-shaped magnets and/or cylindrically-shaped magnets, with accompanying field pole members. For example, a motor designer can start by defining the desired structural and/or operational characteristics for the motor, including the magnet shape or the shape of a pole face for the field pole members. A set of design motor rules (or constraints) can be developed and applied to the structural and/or operational characteristics to make specific choices that determine specific aspects of the motor design. To achieve one or more performance characteristics, design tradeoffs are made among a variety of structural and/or functional characteristics. For example, improvement of one performance characteristic, such as output torque, might affect another desired characteristic performance characteristic, such as the size or weight of the motor. Because of these tradeoffs, the motor design process can be an iterative process where a set of choices is made and then compared to the desired outcome. Then, those choices can be modified to see if an overall better design outcome can be achieved.

In one embodiment, a method identifies a subset of structural and/or operational characteristics for at least designing a motor. The method can also define the basic motor constraints, such as the overall motor outside diameter, a stator assembly diameter and/or cross-sectional area for an arrangement of field pole members (e.g., active field pole members), desired output torque, operating speed, acceleration requirements, acceptable current density, maximum speed, load inertia, available input power, motor driver, control strategy, and the like. In particular, the method can modify the subset of structural and/or operational characteristics to design a motor that can achieve a subset of performance characteristics. For example, these performance characteristics include, but are not limited to: maximum torque per unit volume, maximum torque per unit weight, efficiency, high rotational speed, detent minimization, ripple torque minimization, manufacturing cost, and the like. In a specific embodiment, a motor is designed using a prioritized list of performance characteristics. In some embodiments, a computer readable medium includes one or more instructions for implementing the methods of the various embodiments of the invention. As such, a group of program instructions can be implemented to design a motor that achieves a particular performance characteristic in view of certain motor design constraints.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Definitions

Figure 1:
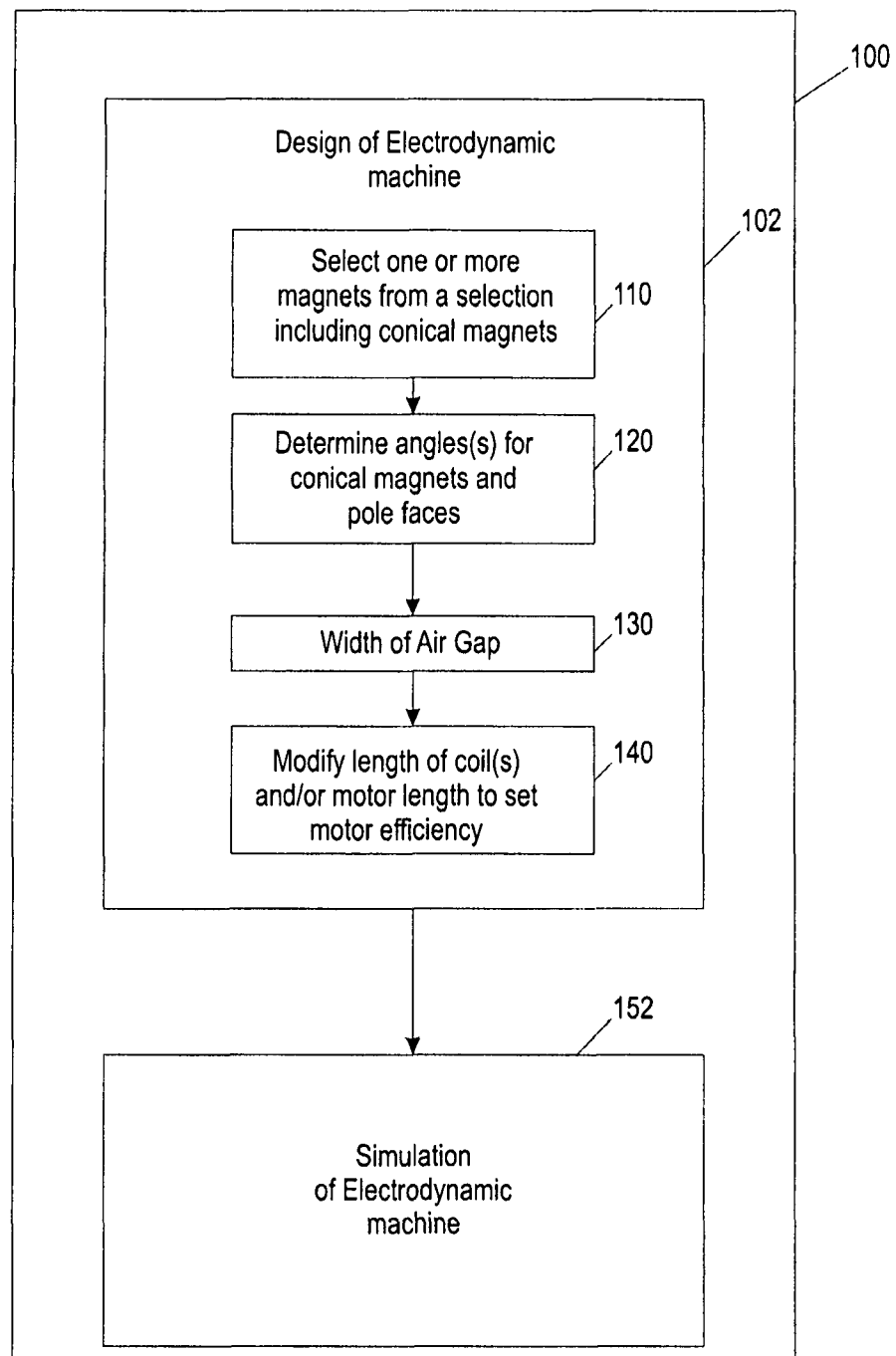
FIG. 1 is a generalized flow for designing and simulating an electrodynamic machine in accordance with a specific embodiment of the present invention.

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative motion between a rotor and a stator, for example, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils).

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally to a portion of a field pole member around which a coil is wound.

As used herein, the term "copper loss," at in at least one embodiment, generally refers to the power losses in coil windings, regardless of the material of which the winding is constituted. These losses can be expressed in terms of the product of the resistance of windings, (e.g., in ohms), and a current, "I", squared, (e.g., in amperes squared, or I^2). Alternatively, this term can be referred to as "I^2 R loss."

As used herein, the term "core" refers to a portion of a field pole member where a coil is normally disposed between pole shoes and is generally composed of a magnetically permeable material for providing a part of a magnetic flux path. In some embodiments, the formation of the "core" also forms the field pole member with or without pole faces. In other embodiments, the core is formed as a base structure onto which end caps or the like can be formed.

As used herein, the term "field pole member" refers generally to an element composed of a magnetically permeable material and being configured to provide a structure around which a coil can be wound (i.e., the element is configured to receive a coil for purposes of generating magnetic flux). In some embodiments, a field pole member includes a core (i.e., core region) and at least two pole shoes, each of which is generally located near a respective end of the core. But in other embodiments, a field pole member includes a core and only one pole shoe. In some embodiments, the term "field pole member" can be described generally as a "stator-core." In at least one embodiment, a field pole member generally has an elongated shape such that the length of the field pole member (e.g., the distance between the ends of the field pole member) is generally greater than its width (e.g., the width of the core).

As used herein, the term "active field pole member" refers to an assemblage of a core, one or more coils, and at least one pole shoe. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally unto itself. As such, the term magnet includes permanent magnets, electromagnets, and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials, including laminate steels and cold-rolled grain oriented ("CRGO") steels, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as either a "stator surface" or a "flux interaction surface" (or a portion thereof), or both.

As used herein, the term "pole shoe" refers to that portion of a field pole member that facilitates positioning a pole face so that it confronts a rotor (or a portion thereof), thereby serving to shape the air gap and control its reluctance. A pole shoe of a field pole member is generally located near an end of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated magnetically permeable powder metal materials that can be molded to form an element of the rotor-stator structure of the present invention.

As used herein, the term "transition region" refers to an optional portion of a pole shoe that facilitates offsetting or diverting a segment of a flux path (e.g., within a core region) to another segment of the flux path (e.g., within a pole shoe). One or more pole shoes can implement transition regions to improve motor volumetric utilization (e.g., by placing coils in a compact configuration nearer to an axis of rotation). Generally, the transition region can keep the reluctance of the field pole member relatively low while facilitating compaction of the elements constituting an electrodynamic machine. Such elements include shafts, field pole members, magnets and the like.

Discussion

FIG. 1 is a generalized flow for designing and simulating an electrodynamic machine in accordance with a specific embodiment of the present invention. Flow 100 provides for the design of an electrodynamic machine at 102 as well as the optional simulation of the electrodynamic machine at 152. Note that in some embodiments, the design at 102 and the simulation at 152 can occur substantially in parallel and/or reiteratively. Flow 100 selects one or more magnets at 110 from a selection of magnets that includes conical magnets. The one or more magnets can be for a rotor of the electrodynamic machine. In some cases, the selection can also include cylindrical magnets. Conical-shaped and cylindrical-shaped magnets that are suitable for practicing at least one embodiment are described in U.S. Pat. No. 7,061,152 B2 and U.S. patent application Ser. No. 11/255,404. Generally, a choice between cylindrical or conical magnets influences the structure and/or operational characteristics of components that, in turn, can affect the performance characteristics of a motor design. Generally, conical magnets can provide an optimal overall packing density, as well as a relatively superior flux path with minimal flux leakage. The use of cylindrical magnets can ease motor production. Note, too, that flow 100—in some embodiments—can select either a single magnet or two magnets (i.e., the "dual magnet design"). The dual magnet design can produce an optimal flux path by excluding the use of "back iron" structure to establish a return path. The dual magnet design can also reduce magnetic flux leakage in some cases. And since some unique motor configurations are directly related to magnet volume, two smaller magnets can be easier to package and manufacture than one large magnet. In at least one embodiment, flow 100 can be preceded by determining a set of constraints that will restrict certain aspects of the motor design. Note that FIG. 1 represents a subset of an exemplary design method to obtain, for example, structural and/or operational characteristics that relate to at least one embodiment of motor design When conical magnets are selected, flow 100 can continue to 120. Here, the flow determines an angle ("alpha" in FIG. 3) at which a surface of a conical magnet is located with respect to an axis of rotation, as well as another angle ("theta" in FIG. 3) at which a pole face surface of a field pole member is located with respect to the axis. In various embodiments, these angles can be the same or can be different, and they can influence the magnet length ("L" in FIG. 3) along an axis as well as the surface area of a pole face. Note that the pole face area multiplied by the air gap flux density produced by the magnet can determine the level of flux in the field pole core midsection, thereby influencing motor torque production. Flow 100 then determines a width ("W" in FIG. 3) of an air gap at 130, such as air gap 303 of FIG. 3. In some embodiments, the width of an air gap is synonymous with its thickness. Regardless, the torque production for motors of some embodiments need not be strongly dependent on the width of the air gap as the use of both two conical magnets and highly permeable field poles create a favorable magnetic flux path. However, the gap width can affect the total flux leakage around the magnets. In one instance, a narrow air gap can reduce stray flux leakage. So, if leakage is not considered to be a relevant constraint for a motor design, flow 100 can vary the width of the air gap in favor of optimizing other structural and/or operational characteristics.

Flow 100 can continue to 140. Here, motor efficiency can be set by changing coil and motor length ("L" in FIG. 2 and "LL" in FIG. 3) while maintaining, for example, a substantially constant coil diameter (and/or cross-sectional area of an arrangement of active field pole members), unlike predominant conventional motors and their designs. In one embodiment, the coil length can be changed while maintaining other features (or structural and/or operational characteristics) of the motor. Note that changing coil length alters the $I^2R$ copper loss in the motor. And since copper loss is a controlling factor in the design of motors, this means that the motor efficiency can be directly adjusted. That is, the length of the coil can be extended without materially affecting a motor's overall magnetic characteristics. In whole or in part, this is because of the flux path(s) created by a dual conical magnet configuration as well as the high permeability of the field pole members.

Figure 2:
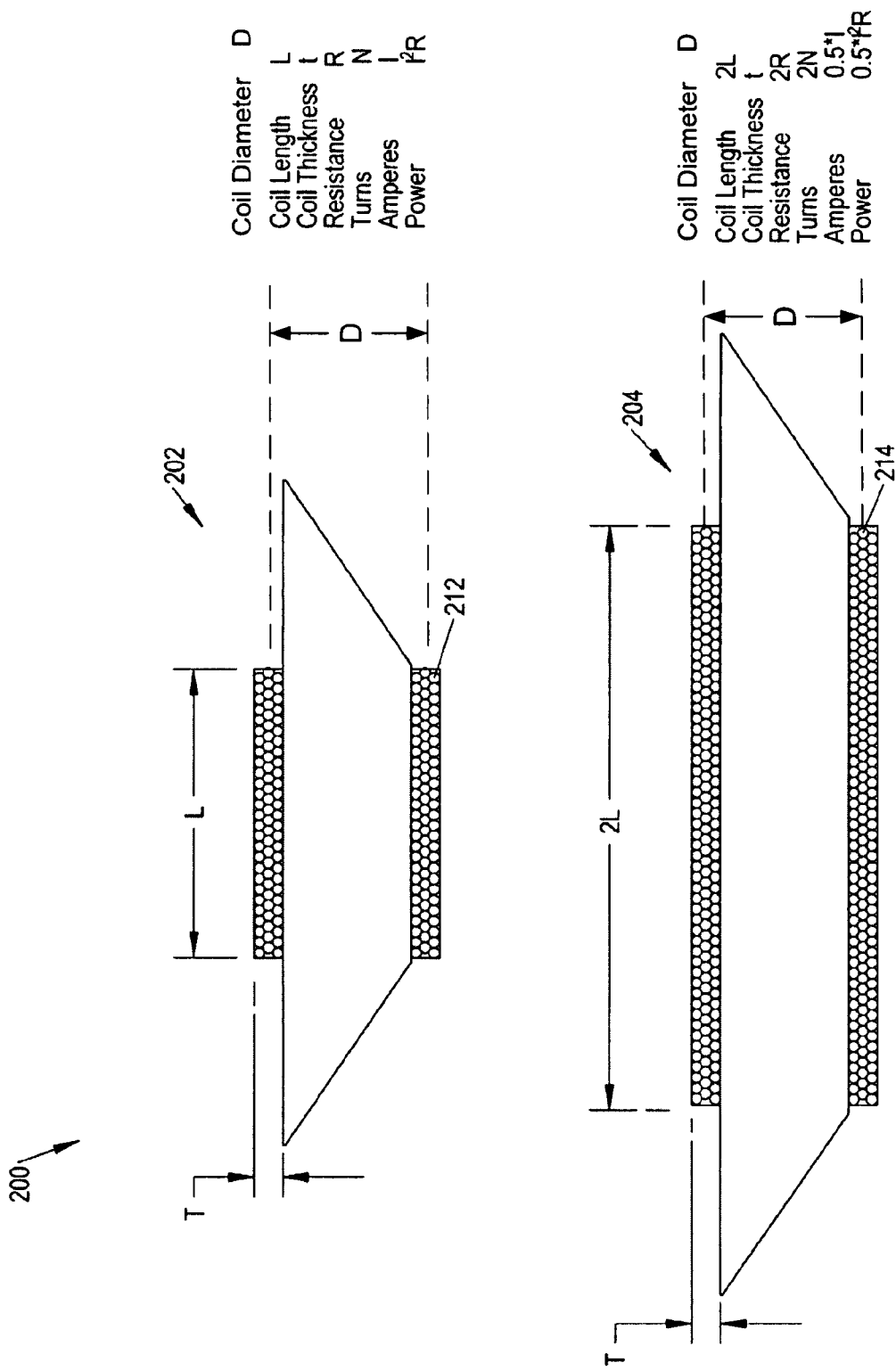
FIG. 2 illustrates the modification of a rotor-stator size—as a structural and/or operational characteristic—for adjusting a performance characteristic of a motor, according to an embodiment of the invention.
Figure 5:
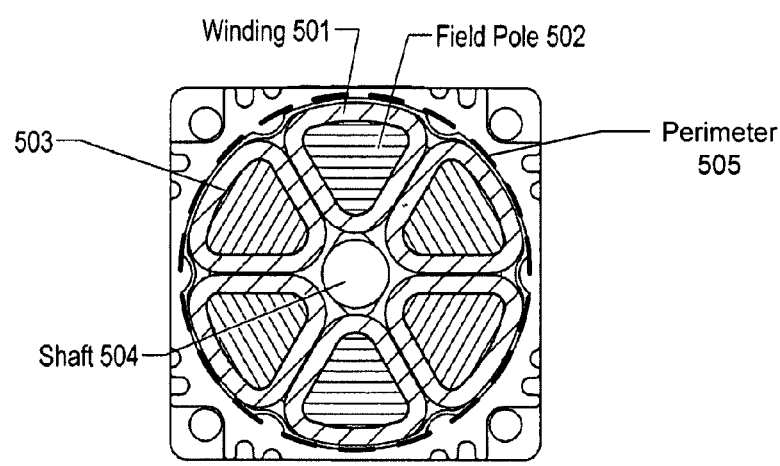
FIG. 5 depicts a cross-section end view of the motor topology shown in FIG. 4 to illustrate additional structural/operational characteristics of motor components that can influence motor design, according to a specific embodiment of the invention.

FIG. 2 illustrates the modification of a rotor-stator size—as a structural and/or operational characteristic—for adjusting a performance characteristic of a motor, according to an embodiment of the invention. Diagram 200 shows field pole member 202 and field pole member 204. First consider that field pole member 202 is used for a first motor, and has a coil length of "L" and a coil thickness of "T." This coil 212 will have "N" turns of a specific wire size with resistance of "R," and it will operate at "I" amperes of current to produce "TQ" torque. Next consider the use of field pole member 204, whereby the length, "L," of coil 212 is doubled. Coil 214 would then have a coil length of "2L." In one embodiment, the coil thickness, "T," can remain substantially constant during the resizing of the coil length and/or the field pole member length. By doubling the coil length to 2L, this doubles the number of turns of a specific wire size to "2N." Thus, coil 214 has a resistance of "2R" and will operate with current at about one-half "I" or "0.5I" to produce "TQ" torque. The power, "P1," in the first case can be "I squared times R" and the power in the second case, "P2," can be "(0.5I) squared times 2R." As such, power P2 is equivalent to one-half power P1. As such, motor efficiency can scale with the motor's length, but be independent of any or all of the following: a cross-sectional area of, for example, an arrangement of field pole members and/or a diameter of stator assembly, the coil diameter, the coil thickness, and/or wire size. In some embodiments, a performance characteristic, such as efficiency, a motor constant ("Km"), and torque, can be adjusted by, for example, changing a coil length while maintaining a cross-sectional area of a stator assembly of a rotor-stator structure (e.g., an assemblage of field poles and coils) in a plane that is perpendicular (or substantially perpendicular) to an axis of rotation. As shown in FIG. 5, perimeter 505 encloses a representative cross-sectional area that can remain relatively constant, for example, during adjustment in lengths of a coil (e.g., in an axial direction) and/or a field pole member (e.g., an active field pole member) for changing one or more performance characteristics of a rotor-stator structure. As used herein, the term "coil length" refers, at least in one embodiment, to the end-to-end dimension of a coil measured in substantially an axially direction. As such, the coil length can, in some cases, be determined with respect to the length of a field pole around which the coil is wound. In one embodiment, the coil length of cantered windings can be determined substantially parallel to the length of a field pole and the axis of rotation.

By doubling the coil length, L, (without changing the coil thickness) the power required to produce approximately the same torque can be cut in half. Also, the flux path design of the design motor need not be affected by an increase in either a coil length or a field pole length, or both. Also, no changes need be necessary to the magnets or pole shoes of the field poles. Rather, it is sufficient to change the length of a coil, and optionally the length of the field pole member, to alter, for example, a performance characteristic. So to improve efficiency, the design modifications (as well as manufacturing costs) can generally be associated with changes in the length of the coil, as well as optional changes in the lengths of the field pole members. As such, a change in a physical attribute or a size of a rotor-stator structure component, such as length, can change motor efficiency. For example, if the length of the coil is changed to 3L, the power drops to $0.333I^2R$. With long extended motors, relatively high performance with respect to torque and speed can be obtained with reduced currents. As should be readily apparent, if a designer desires to attain a higher output torque, the designer can set the current to remain constant to maintain the same power dissipation, and then increase the coil length, rather than reducing the current for the purpose of reducing the power dissipation and increasing efficiency. Note that torque production is limited to magnetic saturation of materials. As such, this approach of changing the length of the coil to produce more torque, for example, will generally continue to work until magnetic saturation of the field poles is reached.

Figure 3:
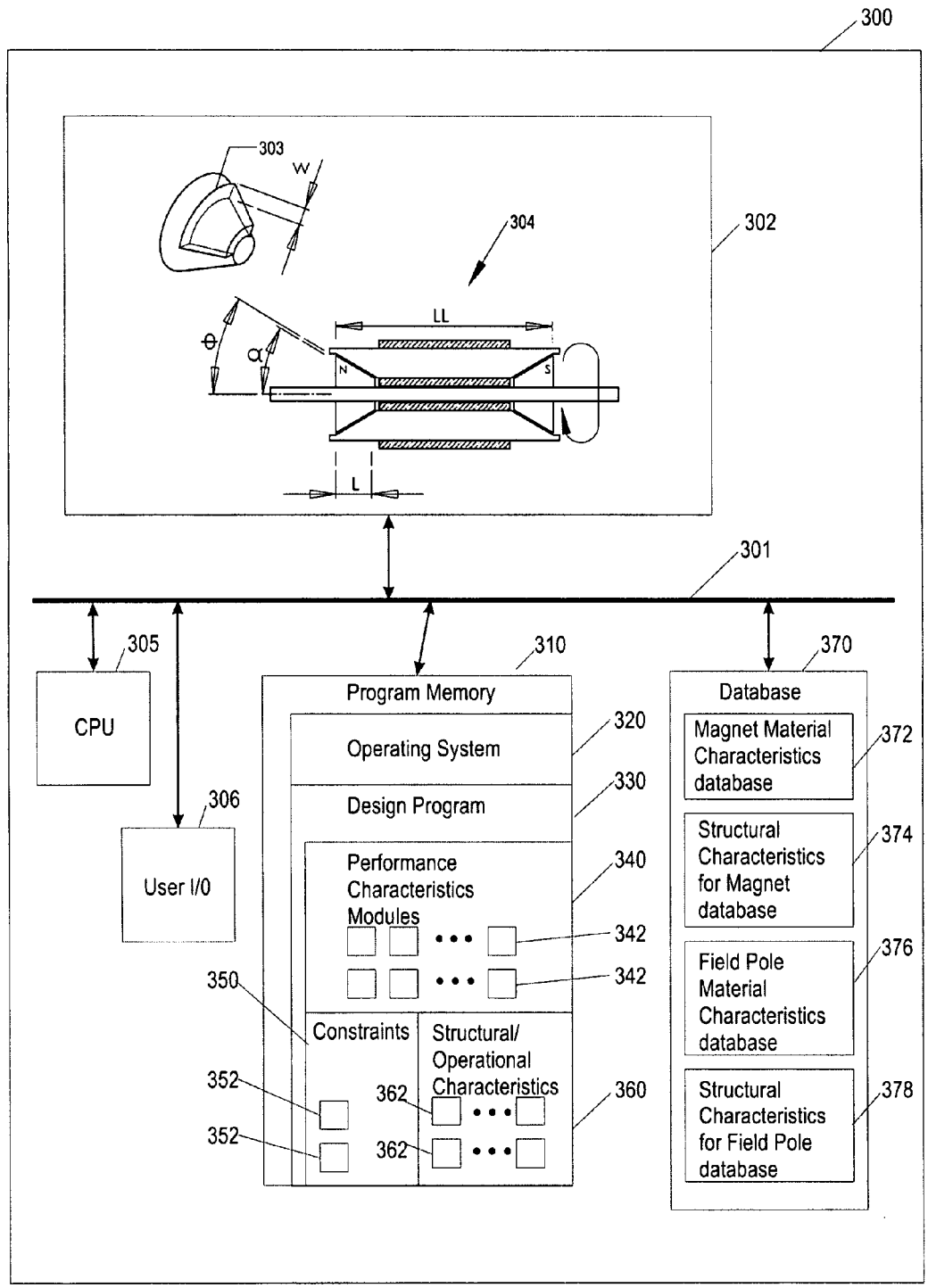
FIG. 3 is a block diagram illustrating a computer apparatus for at least designing a motor using a computer-based model, according to a specific embodiment of the present invention.

FIG. 3 is a block diagram illustrating a computer apparatus for at least designing a motor, according to a specific embodiment of the present invention. Computer apparatus 300 includes a display for presenting a graphical user interface 302, a processor ("CPU") 305, user inputs/outputs ("I/O") 306, program memory 310 and additional memory for implementing a database 370, all of which are communicatively coupled by a bus 301. User inputs/outputs ("I/O") 306 can accept data describing motor components using a command line interface (not shown) or graphical user interface 302. Program memory 310 includes executable instructions for implementing an operating system 320 and a design program 330, which includes repository 340 of performance characteristics modules 342 in this example. As used herein, the term "design program" refers generally, at least in one embodiment, to executable instructions for modeling, analyzing and/or predicting responses and interactions of a motor design and its components. In various embodiments, design program 330 can be used in computer-aided design ("CAD") applications, computer-aided manufacturing ("CAM") applications, and computer-aided engineering ("CAE") applications to generate a model of a rotor-stator structure and/or an electrodynamic machine, according to various embodiments of the invention. As such, design program 330 can be used to design and simulate mechanical, electrical and/or magnetic aspects for the purposes of simulation, drafting, engineering, performing analysis and manufacturing. As used herein, the term "performance characteristic" generally refers, at least in one embodiment, to a characteristic for a motor that, for example, is quantifiable and can be used to compare against the performance of other motor designs.

Each of performance characteristics modules 342 is composed of executable instructions for designing a motor to achieve a certain performance characteristic. Examples of performance characteristic modules 342 include instructions for maximizing torque per unit diameter (e.g. diameter of a stator assembly) or cross-sectional area (e.g., of an arrangement of field pole members), maximizing motor efficiency, improving a motor constant, Km, maximizing torque per unit weight, maximizing high speed operation, minimizing detent and torque ripple, minimizing manufacturing cost, optimizing current density, determining a maximum speed of operation, and the like. When a specific performance characteristic module 342 is executed, it can reference one or more structural/operational characteristics modules 362 and/or one or more constraint modules 352 to determine the particular performance characteristic.

In at least one embodiment, CPU 305 executes instructions constituting design program 330 to apply constrains associated with constraints modules 352 to the structural/operational characteristics associated with structural/operational characteristic modules 362 to make specific choices that determine the specific performance characteristics of the motor design. To achieve one or more performance characteristics, design tradeoffs can be made among a variety of structural and/or functional characteristics. For example, improvement of one performance characteristic, such as output torque, might affect another desired characteristic performance characteristic, such as the size or weight of the motor. Because of these tradeoffs, the motor design process can be an iterative process where a set of choices is made and then compared to the desired outcome. Then, design program 330 can modify those choices to see if an overall improved design outcome can be achieved in view of one or more performance characteristics sought. In one embodiment, performance characteristic modules 342 are prioritized such that design program 330 operates to modify various structural/operational characteristics to attain those performance characteristics having a higher priority. In some embodiments, one or more constraints can be assigned as a higher priority. In at least one embodiment, design program 330 operates to optimize a subset of performance characteristics.

In this example, design program 330 can include a repository 350 that includes constraints modules 352, which, in turn, contains data representing constraints. Constraints modules 352 can also include instructions for determining the same. As used herein, the term "constraint" generally refers, at least in one embodiment, to a threshold or a restriction that limits the design or simulation of the structure and/or functionality for a motor and/or its components. Examples of constraints include overall motor outside diameter, a diameter of a stator assembly, a cross-sectional area of an arrangement of field pole members, desired output torque, operating speed, acceleration requirements, acceptable range of current density, maximum speed, load inertia, available input power, motor driver characteristics, control strategy-related parameters (e.g., parameters related to commutation) and the like. A constraint can be expressed as a minimum, as a maximum, or a range. In some cases, constraints modules 352 can include instructions to, for example, solicit input from a designer or extract data from a database, as well as other constraint-related instructions. Further, a constraint can be an environmental factor under which a motor will operate, such as an ambient temperature (e.g., 140 degrees F.) or a maximum amount of available input power to operate a motor. Note that in some embodiments, the diameter of a stator assembly and the cross-sectional area of an arrangement of field pole members can be determined relative to a common reference, such as perimeter 505 of FIG. 5.

Further, design program 330 of FIG. 3 can include another repository 360 including structural/operational characteristics modules 362. As used herein, the term "structural/operational characteristic" generally refers, at least in one embodiment, to either a structural attribute or an operational attribute, or both, of a constituent component for a motor. Examples of structural attributes can include, for example, a physical dimension, a physical orientation relative to other components, a property of a component, and the like. For example, a physical dimension includes a length of a field pole member. A motor, for example, can be composed of any number of field pole members and any number of magnets, whereby design program 330 determines the number of field pole members and magnets to meet one or more performance characteristics. A coil, for example, can have physical dimensions relating to length, cross-sectional area and a number of turns, and can have a property relating to conductivity, due, in whole or in part, to its material (e.g., copper). A field pole member, for example, can have physical dimensions relating to length and cross-sectional area, and can be composed of subcomponents, such as a field pole core and pole shoes, which, in turn, include pole faces having a certain physical dimension, such as being contoured or angled. Further, the field pole member can have a property relating to magnetic permeability, due, in whole or in part, to its material (e.g., soft magnetic composites). A magnet, for example, can have physical dimensions relating to length, cross-sectional area, an angle relative to an axis of rotation (or motion, if implemented in a linear motor), and a curved surface coextensive with an arc at a distance from the axis of rotation. As such, the curved surface of a conical magnet or a cylindrical magnet can have dimensions that mimic pole faces having a physical dimensions that are contoured or angled. Further, the magnet can be composed of subcomponents, such as multiple (e.g., arc) magnets, multiple poles, and the like. In some cases, the magnet is a monolithic magnet. In addition, a magnet can be an axially polarized disk-like magnet. In at least one embodiment, the magnet can include a number of magnet subcomponents mounted on or in a magnetically permeable support, which, in turn, can be mounted on a shaft. Examples of operational attributes can include, for example, functional attributes of a component, such as the strength and/or direction of polarization of a magnet. Further, functional attributes of a component can describe how the component behaves and/or interacts, such as electrically, magnetically, and/or mechanically, with one or more other components.

Therefore, structural/operational characteristics modules 362 can include data, or instructions for retrieving data, that describe the structural/operational characteristics of individual components of a motor (e.g., a coil, a field pole member, a magnet, etc.) as well as their operational attributes whether taken alone, such as a direction of polarization of a magnet, or whether interacting (e.g., magnetically) with other components. For example, the structure and functions of individual components, such as a field pole member and a conical magnet, can interact to form an air gap and/or a flux interaction region. As such, an air gap, especially a contoured air gap can be modeled. Note that each of blocks 110, 120, 130, and 140 of FIG. 1 can be implemented as executable instructions in a corresponding structural/operational characteristics module 362. Examples of other structural/operational characteristics modules 362 for designing a motor are discussed in relation to FIGS. 4 and 5. In various embodiments, design program 330 can solicit inputs from a designer for implementation by, for example, modules 352 and 362, as constraints and structural/operational characteristics, respectively. In various embodiments, any one or more constraints and any one or more structural/operational characteristics modules can either be static (i.e., unchanging through the reiteration process by design program 330) or dynamic (i.e., changing at least in some portions of the design process).

Design program 330 accesses database 370 for designing and modeling the behavior of a motor, according to at least one embodiment. Database 370 includes a database 372 for maintaining data representing magnet material characteristics for various types of magnets. The magnet material characteristics can describe the behavior of a magnet made from neodymium iron ("NdFe"), one or more rare earth magnet materials, and/or one or more ceramic magnet materials, etc. These characteristics are maintained within database 372 for access by design program 330. Database 370 can also include a database 374 for maintaining data representing structural characteristics for various types of magnets. As such, database 374 includes conical, cylindrical and other structures (and variants thereof) for implementing rotor magnets of the various embodiments. Further, database 370 can include databases 376 and 378. Database 376 includes data representing field pole material characteristics for describing the behaviors of field members composed of silicon-iron alloys, nickel-iron alloys, cobalt-nickel alloys, steel alloys, iron alloys, magnetic-powdered alloys, soft magnetic composites, and the like. Database 378 includes data describing the structure of a field pole member, such as including laminates, composite of wire, or any other field pole structure described herein or incorporated by reference. Note that in some embodiments, the data describing the structure of field pole members in database 378 and data describing the structure of magnets in database 374 can be entered into computer apparatus 300 via a command line editor or any other data entry technique, including data generated by computer aided design ("CAD") and simulation software that can, for example, perform two and/or three dimensional static, dynamic, and/or frequency response analyses. In one embodiment, design program 330 can include a CAD program for designing and/or simulating electric motors and generators. As such, a designer can use design program 330 to design field pole members and magnets structures (or approximations thereof as defined by, for example, a mesh topology) for confirming structural and functional aspects for a motor design.

In various embodiments, design program 330 can generate a structural and/or functional model of a motor that implements, for example, cylindrical or conical magnets, and can perform static and dynamic analyses using the structural and functional model. As such, design program 330 can determine various motor aspects, such as magnetic flux, force, current density, magnetic flux density, electromagnetic fields, torque, etc. In at least one embodiment, design program 330 delivers physical dimensions of a motor and its components for a motor design that a designer desires to produce. For example, design program 330 can provide a designer with physical dimensions of field pole members and magnets, among other things, so that a designer can produce motors with minimal wasted material, resources and time. In one embodiment, one or more of performance characteristic modules 342, structural/operational characteristics modules 362, and constraints modules 352 can be used for static motor and/or dynamic motor design evaluation. Note that in some embodiments, elements of computer apparatus 300, such as the modules and databases can be distributed across one or more computing devices, for example, connected by a network.

Figure 4:
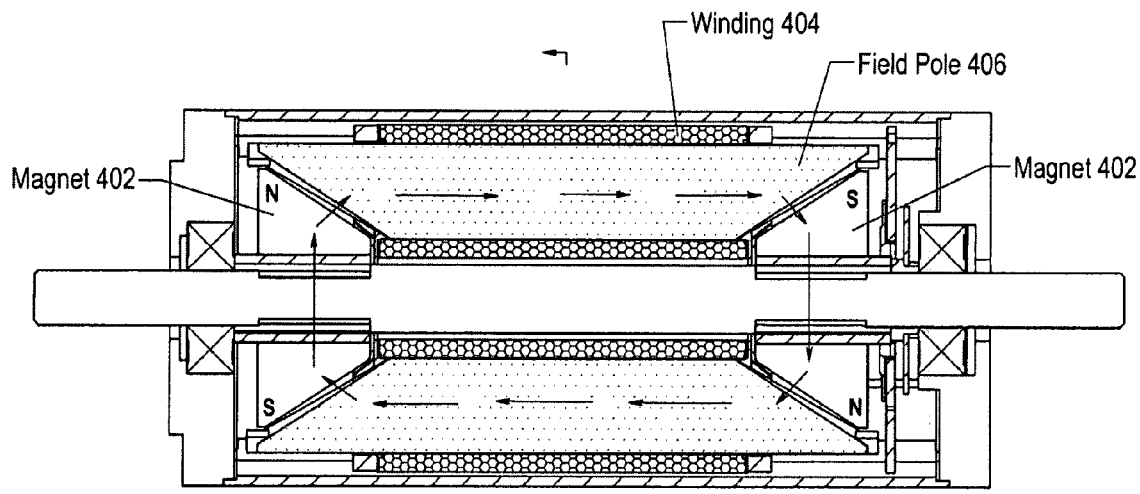
FIG. 4 depicts an example of a lengthwise cross-section view of a motor topology showing structural/operational characteristics of the components influencing the design of a motor, according to a specific embodiment of the invention.

FIG. 4 depicts an example of a lengthwise cross-section view of a motor topology showing structural/operational characteristics of components influencing the design of a motor, according to a specific embodiment of the invention. A first module 362 can include data that describes the structural orientation of the magnet poles of the magnets 402 with respect to each other. In dual magnet configurations, this module can include instructions for adjusting the angle between the magnetic orientations of the two magnets 402. Adjusting the orientation can reduce detent and torque ripple. In cases where the torque curves that express relationships between torque and current, speed, etc. are relatively broad, shifting the angles of magnets 402 does not affect torque output significantly. However, the detent flux concentrations can be relatively narrow, so rotating the magnet polarization of one magnet with respect to the other can offset the individual magnet detents, thereby reducing overall motor detent. A second module 362 can include instructions for determining the behaviors of field pole members 406, as an operational attribute, depending on whether they are modeled as being grain-oriented or an amorphous metal material. Because of the straight shape or the substantially straight shape of the field pole members 406, the option of using a grain-oriented soft magnetic material exists. Grain-oriented materials generally can have relatively better magnetic properties and lower losses than some materials without grain orientation.

A third module 362 can include instructions for determining the percentage of loading for field pole magnetic flux. The level of flux loading of the field pole cross section is generally useful in determining a motor voltage constant and a torque constant. It also can calculate the peak torque in view of, and limited by, for example, field pole saturation. While higher magnetic flux loading can give higher torque constant values, saturation can occur relatively sooner and this can set the ratio and operating points of the continuous operating torque and peak torque of the motor. A fourth module 362 can include instructions for determining the magnetic characteristics of the field pole 406 for designing and simulating a motor. This module includes instructions to determine which type of material is used to manufacture field pole member 406 (e.g., by receiving input from a designer), and instructions to access database 376 to determine structural and/or operational characteristics of the field pole 406, such as permeability and magnetic saturation limits, as well as material and manufacturing costs. A fifth module 362 includes instructions for determining the type of winding for coil 404. The instructions further can describe the physical structure of coil 404 as either a standard round magnet wire or a shaped (e.g., rectangular or square) wire, which can be used to improve the winding packing factor. Further, the instructions for this module can describe coil 404 as a foil conductor for windings that require low resistance and inductance. In addition, instructions can be used to model the effects of a relatively complicated cantered windings that are used to reduce flux leakage from the field pole, thereby improving motor performance.

FIG. 5 depicts a cross-section end view of the motor topology shown in FIG. 4 to illustrate additional structural/operational characteristics of the components that can influence the design of a motor, according to a specific embodiment of the invention. A sixth module 362 can be implemented to execute instructions for determining a number of field poles 502 that can be used. In some cases, the use of even numbers of field poles can help maintain a magnetic balance. A seventh module 362 can include instructions for determining a field pole core shape 503. Shape 503 is generally set by the most efficient packaging of the desired number of field poles in a motor and/or stator assembly having a specific diameter as a motor constraint. In some cases, this can lead to formation of a tear-drop shaped core midsection (not shown) for use with relatively low numbers of field poles. With higher field pole counts, the shape 503 of the cross section for field pole member 502 becomes more triangular. A seventh module 362 can include instructions for determining the iron-to-copper ratio in the field pole cores of field pole members 502 in planes perpendicular to motor axis. Once the total area for the coil (e.g., copper wire) and field pole midsection is determined (e.g., from the motor diameter and/or the diameter of the stator assembly, and the number of field poles used), then the execution of instructions for this module can determine how much of the area is to be used for the iron (flux carrying material) and how much of the area will be reserved for the coil (such as copper, or other any other type of current-carrying material). This ratio can be about 50/50, but can move towards much more iron for maximum torque or much more copper for maximum efficiency, in some cases. In some embodiments, seventh module 362, or another module, can calculate the cross-sectional area of the assemblage of field poles and coils in a plane that are perpendicular (or substantially perpendicular) to an axis of rotation. As shown in FIG. 5, perimeter 505 can enclose a representative cross-sectional area that can be used as a reference value in, for example, efficiency calculations as may be determined by the length of coil (e.g., in an axial direction) and field pole members (e.g., active field pole members).

An eighth module 362 can include instructions for determining a cross-sectional area of the central portion of the field pole member 502. Field pole members 502 tend to first saturate in the lengthwise center section where coil 501 is wound.

This can enable a design to avoid the initial field pole saturation by making the field pole cross section that is perpendicular to the motor axis larger in the midsection than at the ends. This can also create another option to change the coil crosssection configuration to that of cantered windings. A ninth module 362 includes instructions for using sculpted or skewed field pole faces to reduce detent and torque ripple. The distance from the magnet surface to the field pole face can be adjusted as a function of an angle between the axis of rotation and the pole face centerline. In one implementation, this creates a varying air gap distance for each field pole face along a centerline so that the field pole face can have a different air gap distance at a position closest to the field pole core than at or near the axially disposed distal edges of the field pole face (e.g., the pole face edges located farthest from the field pole core). This gap adjustment can change the magnitude of the flux in the field pole versus magnet rotation angle. To illustrate, consider that different angles for theta and alpha in FIG. 3 can provide a variable air gap distance in the axial direction. Variations in field pole flux can lead to detent and by adjusting this flux, detent and torque ripple can be controlled in accordance with various embodiments. A tenth module 362 includes instructions for using skewed field pole members to reduce detent and torque ripple. Optionally, the pole faces of the field poles can be manufactured with a skewed angle to reduce the alignment of the magnet polarization with the pole face edge. Reducing this alignment reduces detent.

Referring back to FIG. 3, constraints module 352 can include data and/or instructions for gathering such data, whereby the data, for example, can describe the constraints as well as instructions for applying motor constraints for the design of a motor. A first set of constraints can define decisions that are generally known to those skilled in the art of motor design. Any of these constraints can be static (i.e., unchanging throughout at least a portion of the design process), or dynamic, according to various embodiments of the invention. Consider a case in which a designer assigns the number "6" as the number of field poles and defines it to be static. As such, design program 330 is prohibited from altering that number to achieve, for example, a certain performance characteristic. However, if the number of field pole member is assigned to be dynamic, design program 330 can alter the number from 6 to achieve the performance characteristic. Thus, in one embodiment, a static constraint can be processed by constraints module 352, whereas a dynamic constraint can be processed as a structural/operation characteristic of the motor, and, thus can be processed, at least in one embodiment, by structural/operation characteristics module 362. In one embodiment, a set of instructions can provide design program 330 with data representing a first set of constraints in association with constraints module 352. Examples of these constraints, without limitation, are listed as follows:

- Type of magnet material
- Strength of magnets
- Number of magnet poles
- Number of field poles
- Operating current density
- Type of bobbin, if any
- Type of potting compound, if any
- Drive configuration and field pole wiring
- Termination requirements and location
- Motor rotor position feedback type, if any
- Motor packaging and envelope constraints
- Mounting constraints
- Cooling method, if any, and heat transference mechanisms, if available.

In one embodiment, a second set of constraints can be implemented in another constraints module 352, which includes instructions for applying one or more of these constraints to the design of a motor. In particular, design program 330 can modify structural/operation characteristics in view of one or more constraints exemplified in the second set of constraints. The instructions for the second set of constraints can include, but are not limited to, the following:

- Instructions to apply an aspect ratio as a constraint to restrict the design of a motor. Aspect ratios tend to range from long and thin for small diameters to short and wide for large diameters.
- Instructions to ensure a certain level of thermal performance is met without exceeding some thermal threshold.
- Instructions to constrain the motor to operate with a relatively high efficiency for specific motor dimensions.
- Instructions to provide a field pole core shaped for optimal packing density.
- Instructions for determining an efficient flux path including substantially straight flux path portions having relatively low losses.
- Instructions to determine a motor having dimensions that have a low or a negligible dependence on air gap width.
- Instructions to require high coercivity magnets.
- Instructions to require a high winding (e.g., copper) packing density.
- Instructions to require simple coil winding pattern to wind a coil.
- Instructions to require a magnetically-balanced motor, having, for example, relatively low detent and torque ripple.

Figure 6A:
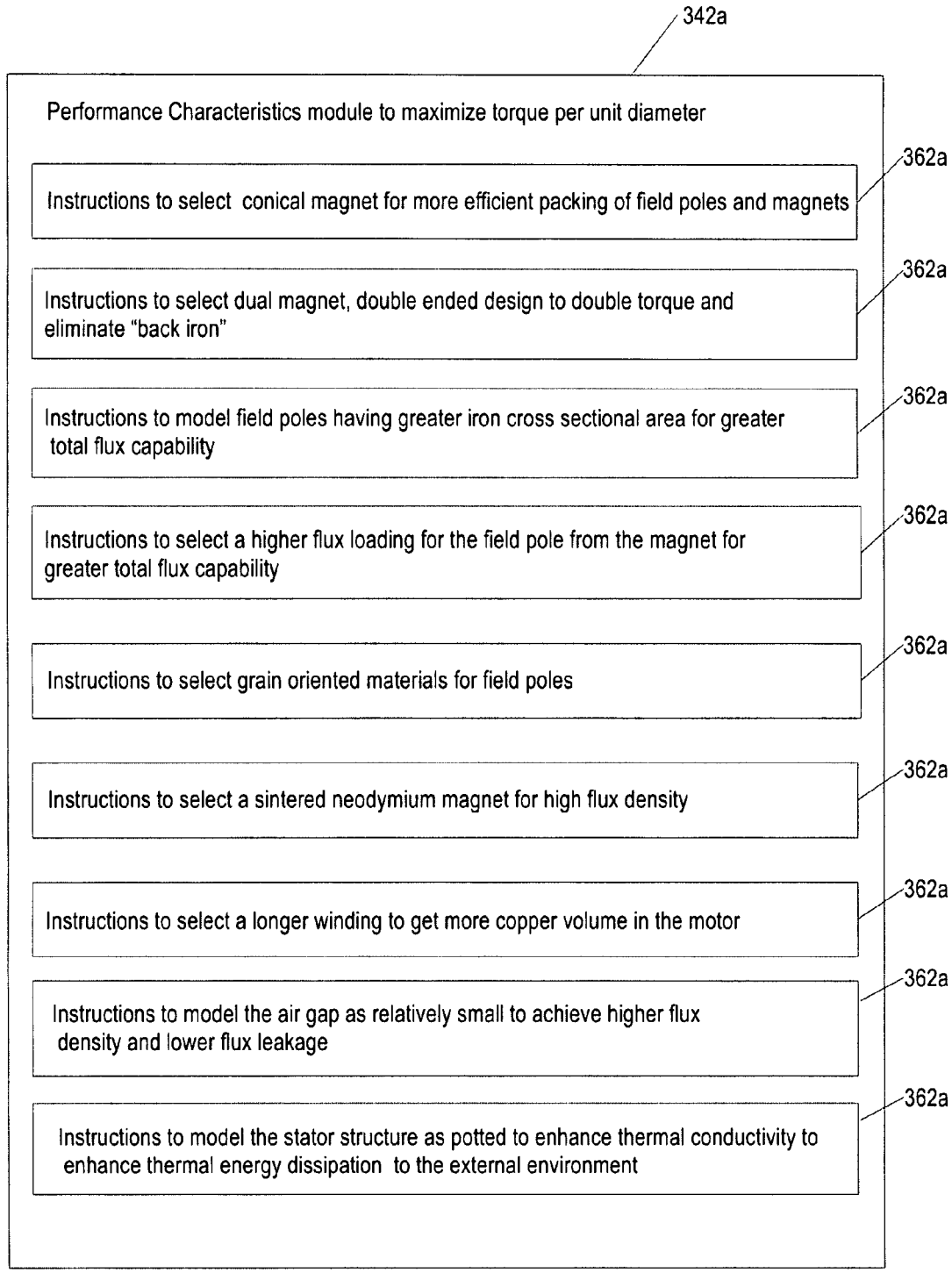
FIGS. 6A to 6F depict examples of various performance characteristic modules that invoke specific modules to implement structural/operational characteristics for achieving one or more performance characteristics for a motor, according to various specific embodiments of the invention.
Figure 6B:
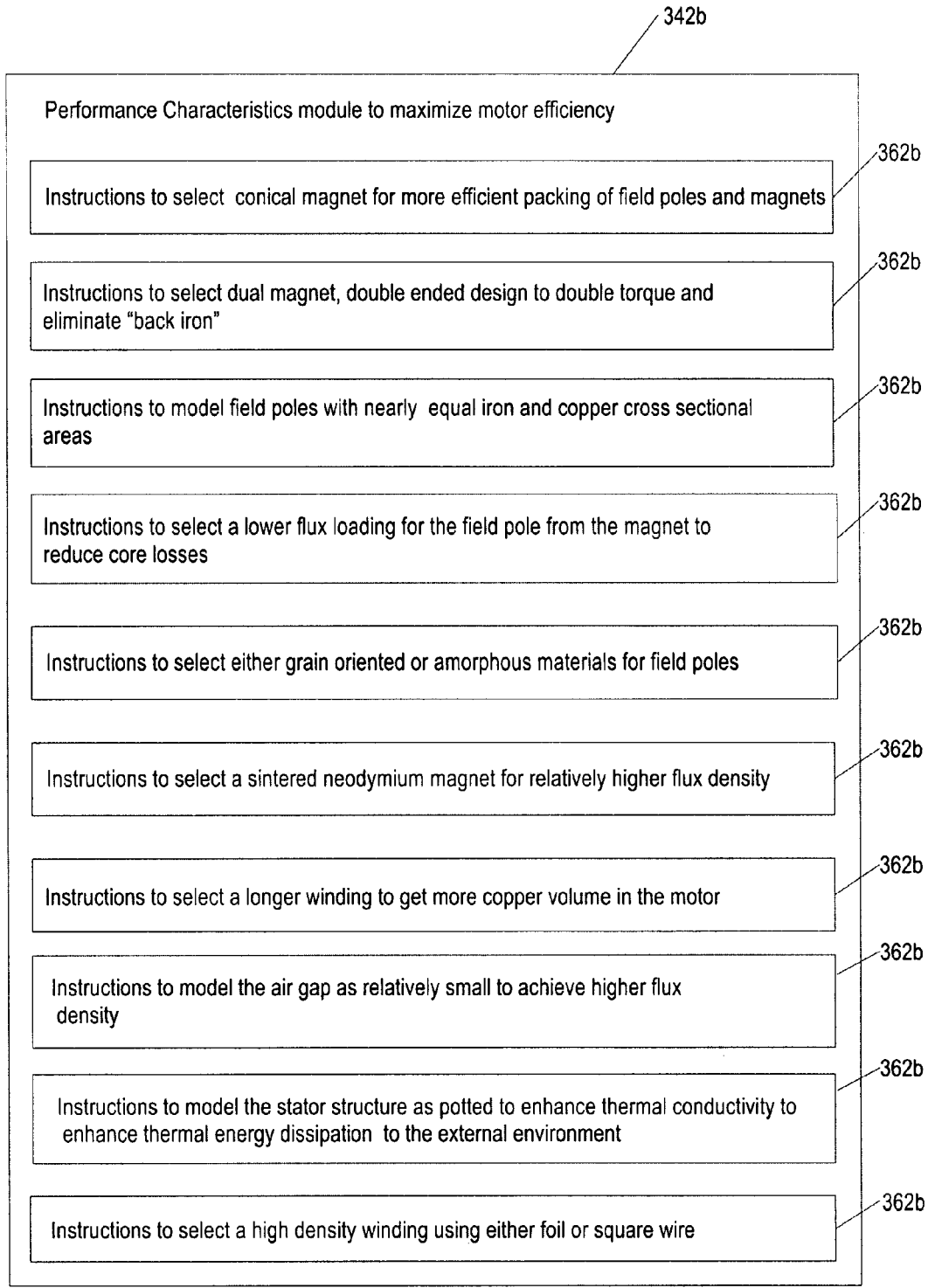
Figure 6C:
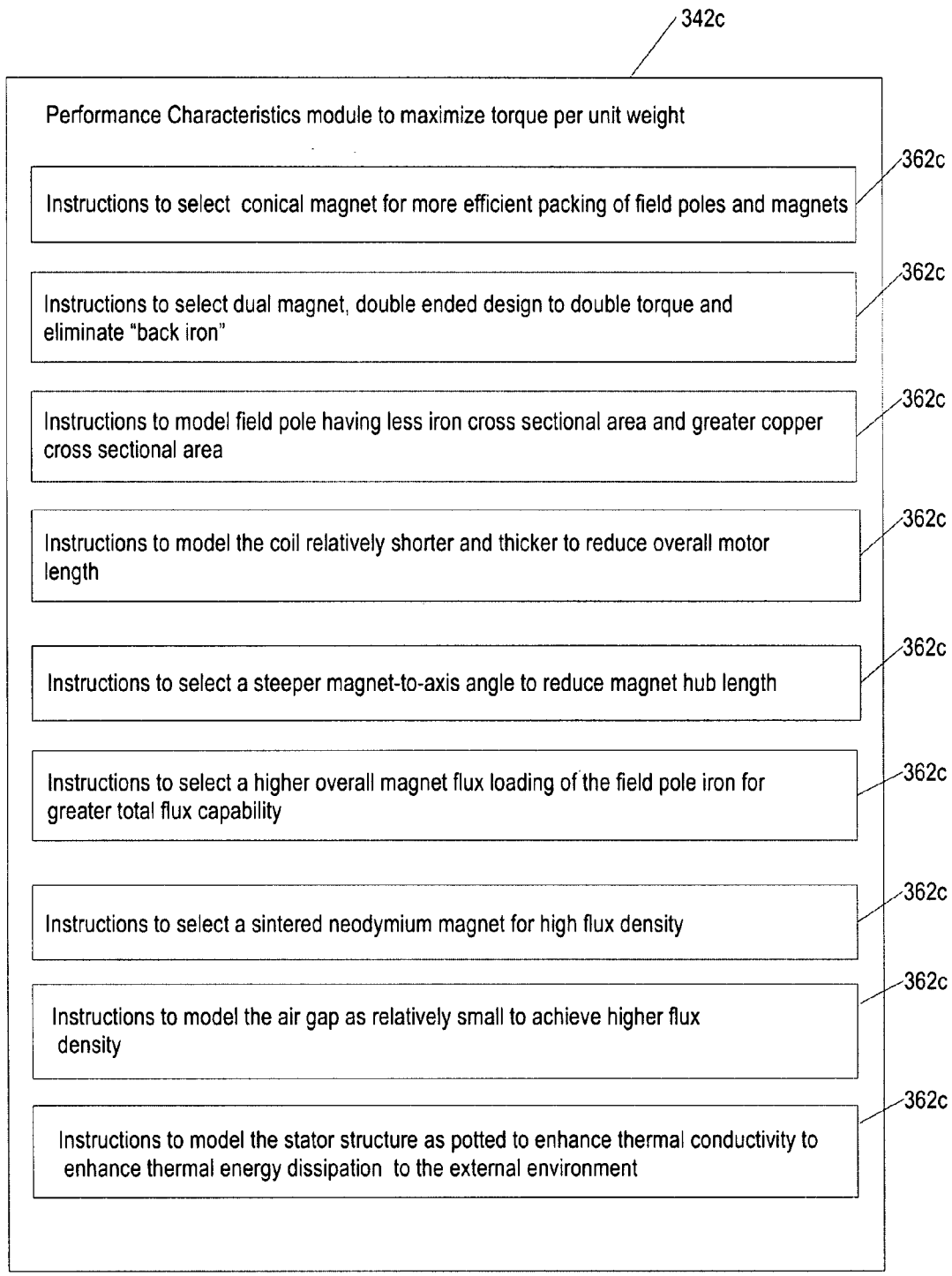
Figure 6D:
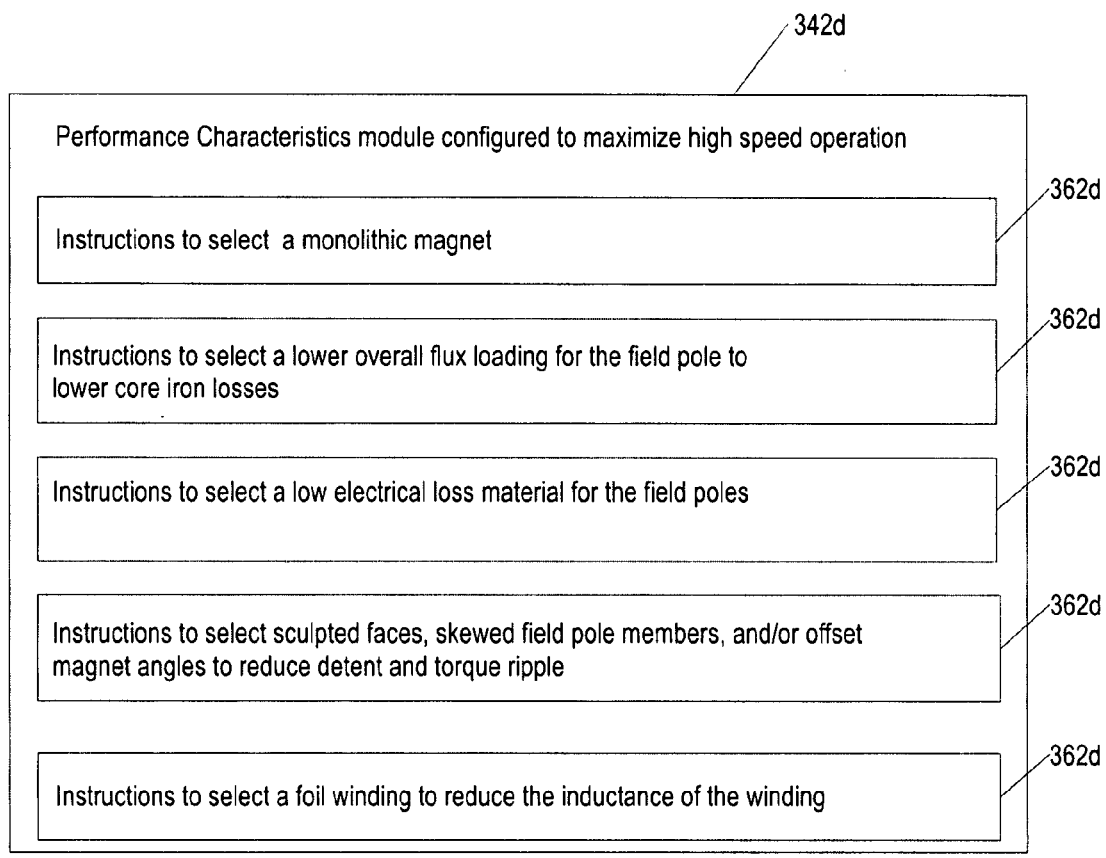
Figure 6E:
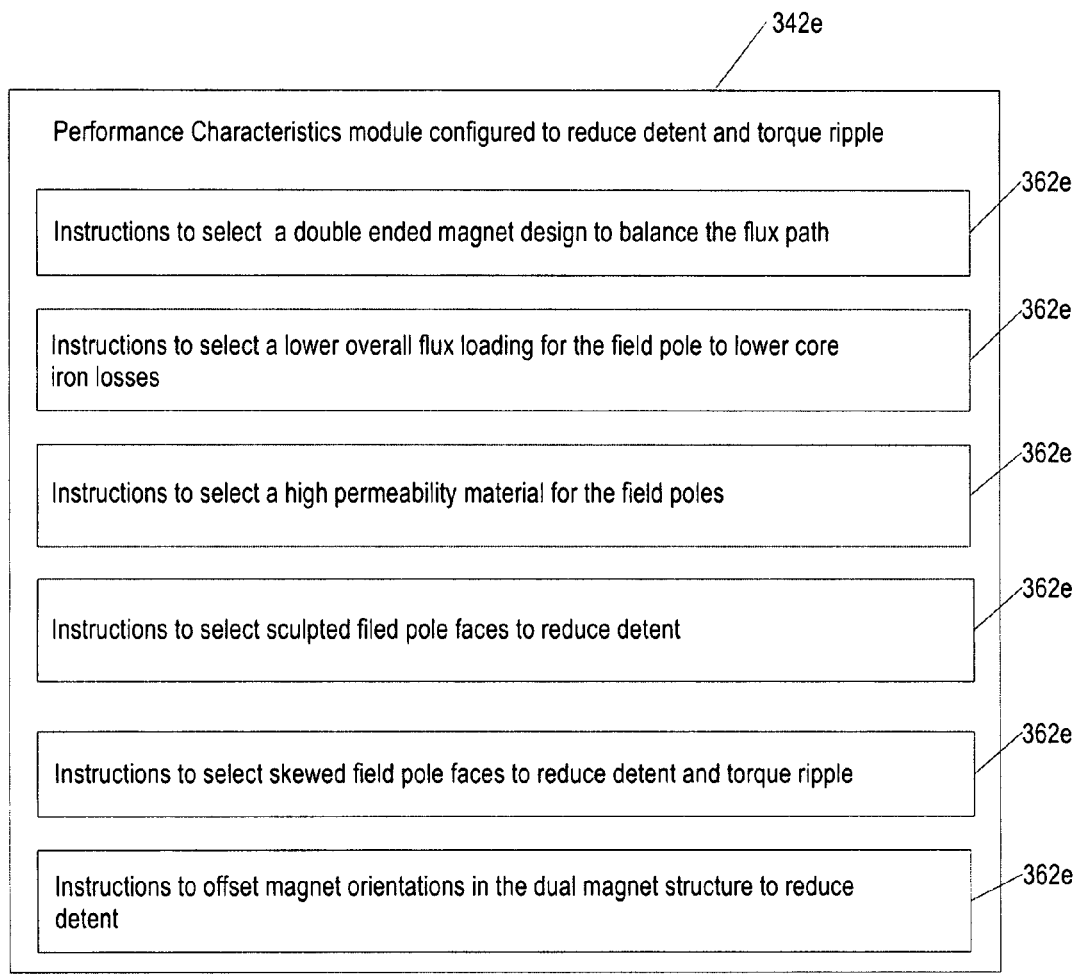
Figure 6F:
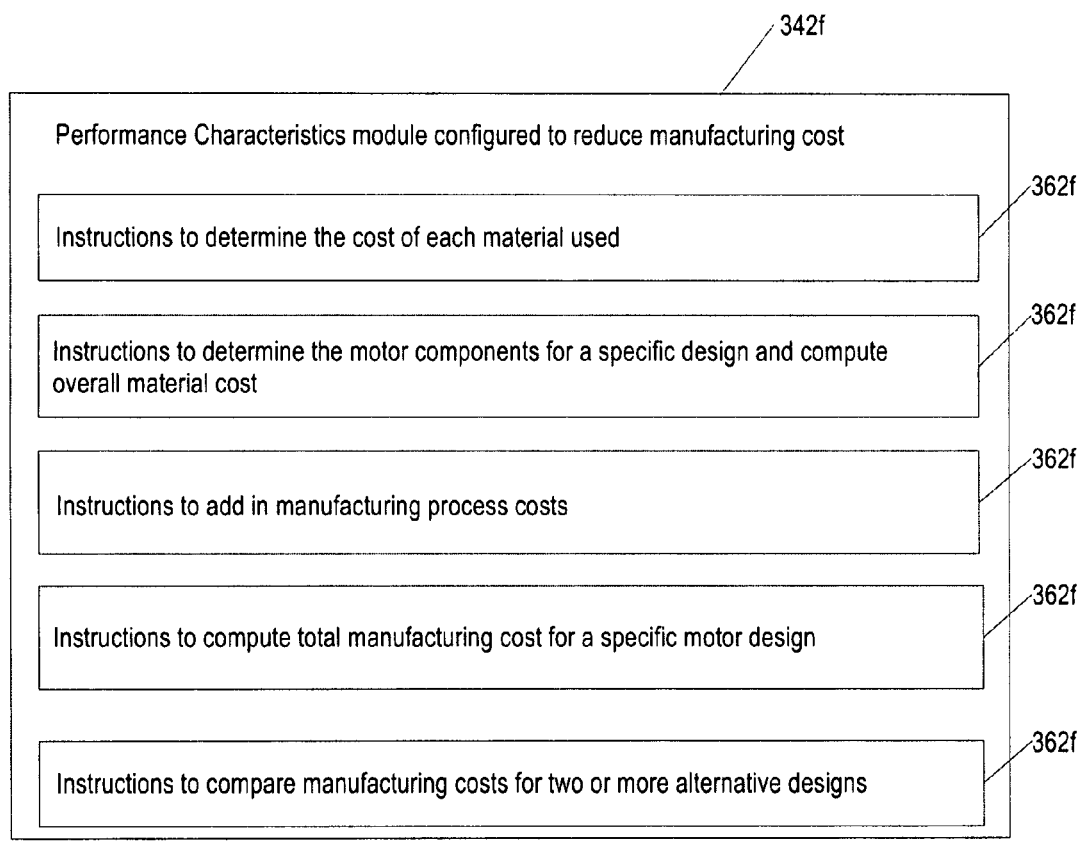

FIGS. 6A to 6F depict examples of various performance characteristic modules configured to invoke specific modules to implement structural/operational characteristics to achieve one or more performance characteristics for a motor, according to various specific embodiments of the invention. In at least one embodiment, each figure represents pseudo-code that, when executed, determines a motor design for achieving a particular performance characteristic. FIG. 6A illustrates an example of a performance characteristic module 342a for maximizing torque per unit diameter. This module includes executable instruction for invoking one or more of the nested structural and/or operations modules 362a shown in FIG. 6A. FIG. 6B illustrates an example of a performance characteristic module 342b for maximizing motor efficiency. This module includes executable instruction for invoking one or more of the nested structural and/or operations modules 362b. FIG. 6C illustrates an example of a performance characteristic module 342c for maximizing torque per unit weight. This module includes executable instruction for invoking one or more of the nested structural and/or operations modules 362c. FIG. 6D illustrates an example of a performance characteristic module 342d for maximizing high speed operation. This module includes executable instruction for invoking one or more of the nested structural and/or operations modules 362d. FIG. 6E illustrates an example of a performance characteristic module 342e configured to reduce detent and torque ripple. This module includes executable instruction for invoking one or more of the nested structural and/or operations modules 362e. FIG. 6F illustrates an example of a performance characteristic module 342f configured to invoke modules 362f to reduce manufacturing cost. Note that these examples shown in FIGS. 6A to 6F are representative of one implementation of a computer program; fewer or more nested modules 362a to 362f can be implemented to support respective modules 342a to 342f. In at least one embodiment, other types of nested modules 362 can be implemented to support other types of modules 342.

Figure 7:
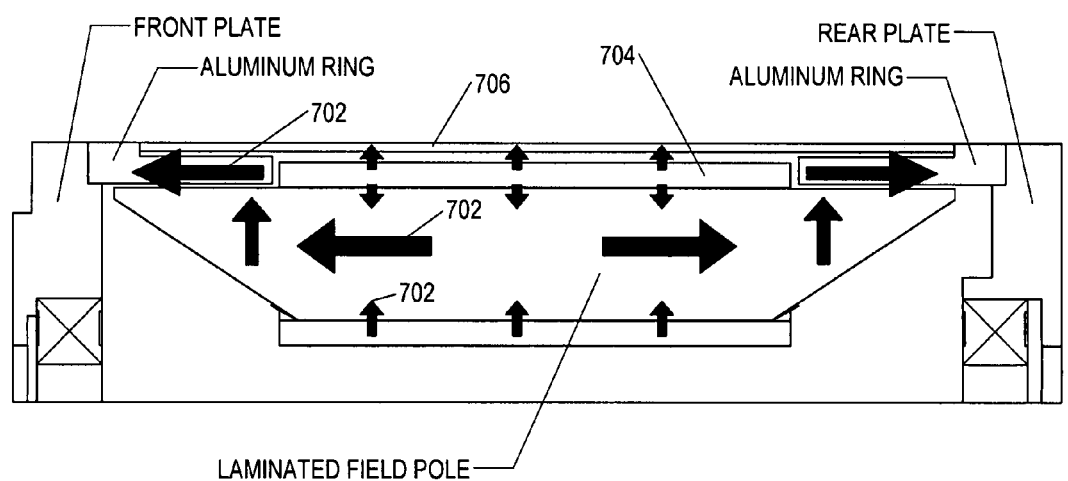
FIG. 7 depicts thermal paths for a motor topology in which a motor and its components are designed in view of thermal performance as a performance characteristic for a motor, according to one embodiment of the invention.

FIG. 7 depicts thermal paths for a motor topology in which a motor and its components are designed in view of thermal performance as a performance characteristic for a motor, according to one embodiment of the invention. Various embodiments of the motor topology provide for thermal conductivity paths 702 that extent from the coil 704 to the external case 706. Because of the way the coil is wound, a significant portion of the outside of the coil 704 can be directly coupled (e.g., mechanically and/or thermally coupled) to the external case 706. Because of the high thermal conductivity of aluminum, which can be used to form external case 706, and the fact that the outside case is substantially continuous (e.g., made from contiguous material), heat can be readily transferred to the ends of the case. Because field pole members extend axially as well as its laminations, for example, heat can also be easily carried from the insides of the coil and down the field pole to where it can easily be coupled to the outside case and motor end plates. With the simple winding for the coil, coils can be wound with a filler material that enhances thermal conductivity. This simple winding geometry also allows for a near optimal wind, which leads to more uniform temperature distribution inside the coil. The aspect ratio of the coil also provides a large surface contact area both on the coil ID and OD and, in general, leads to relatively thin winding wall thickness. In addition, wasted end turns, or turns that are not in good thermal contact with the coil structure can be reduced. Note that improved thermal performance can result in lower coil operating temperatures when running at equivalent power levels. Those lower operating temperatures in turn yield better reliability and allow more design flexibility with respect to material selection which can result in lower manufacturing costs.

Figure 8:
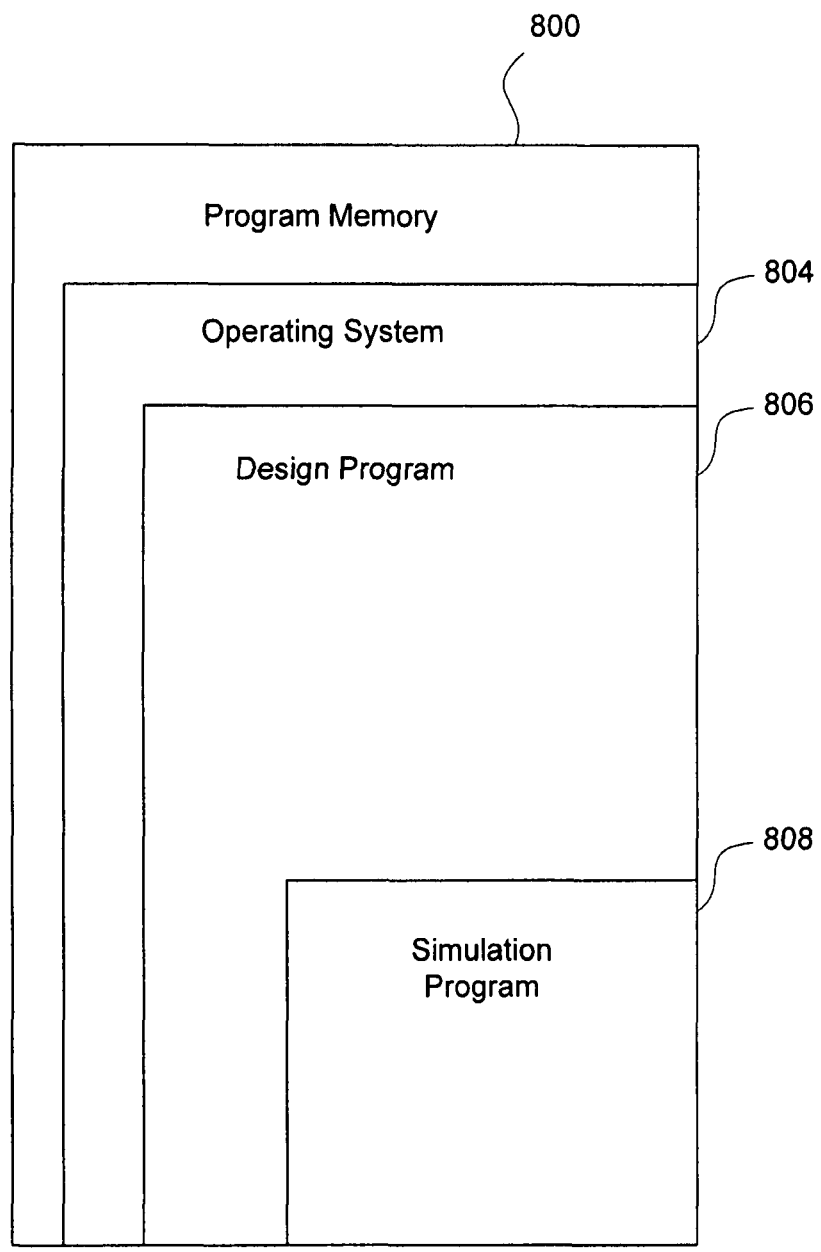
FIG. 8 is a block diagram illustrating a program memory for a computer apparatus configured to at least simulate a motor, according to a specific embodiment of the invention.

FIG. 8 is a block diagram illustrating a program memory for a computer apparatus configured to at least simulate a motor, according to a specific embodiment of the invention. Program memory 800 can include executable instructions for implementing an operating system 804, a design program 806, and a simulation program 808. In one embodiment, simulation program 808 can simulate a virtual representation of a rotor-stator structure for electrodynamic machines composed of data representing conical magnets, for example, and field pole members. Design program 806 can establish that conical magnets can have conical surfaces arranged axially on an axis of rotation such that the conical surfaces face each other, as determined by, for example, a structural/operations characteristic module. The conical magnets can be positioned so that the directions of polarization of the conical magnets can be modeled to be in substantially opposite directions. Design program 806 can also establish that the field pole members can be modeled to be coaxial to the axis and have flux interaction surfaces formed at the ends of the field pole members and adjacent to portions of the conical surfaces that confront the flux interaction surfaces. Thus, simulation program 808 can facilitate the structural and functional cooperation of the field pole members and conical magnets to generate a closed flux path that passes through the field pole members and the conical magnets.

Figure 9:
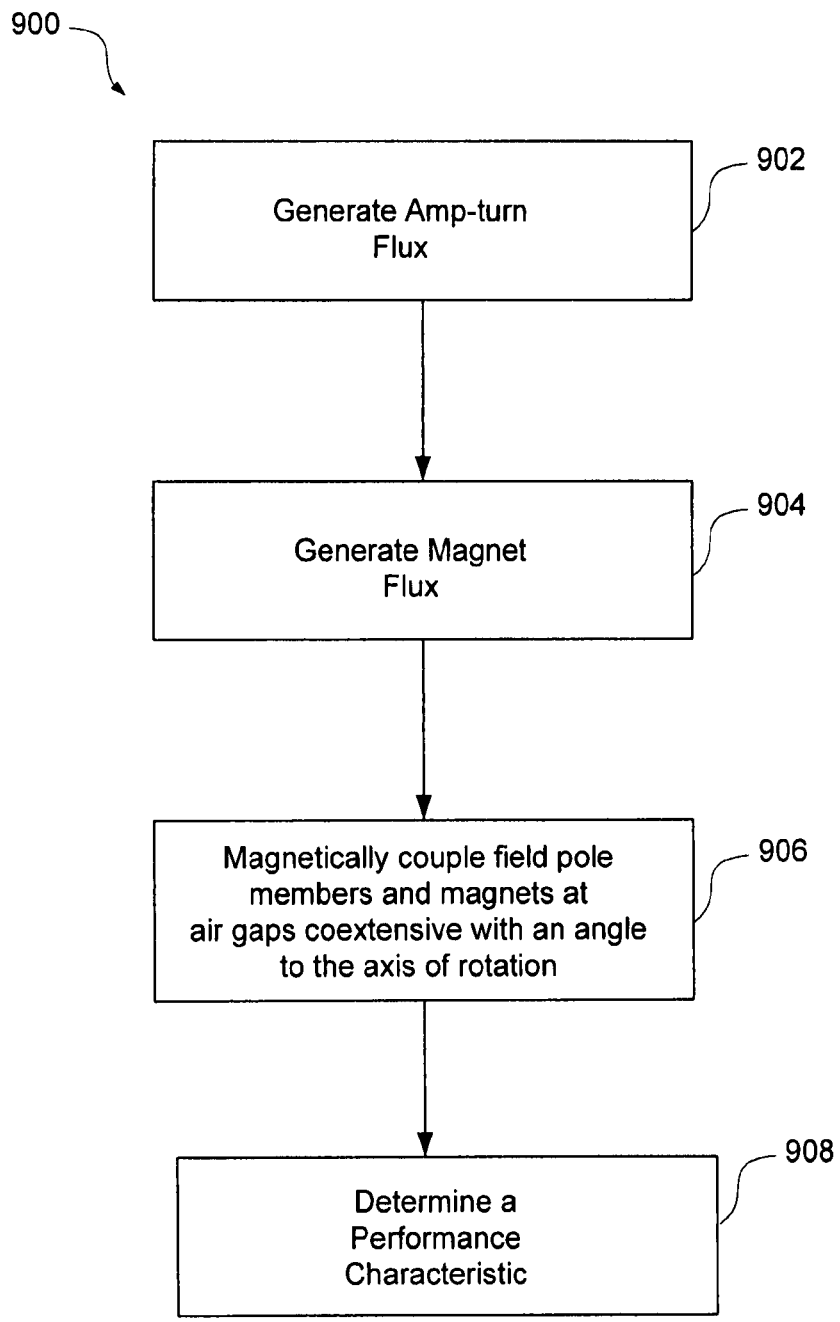
FIG. 9 is a flow that can be implemented by at least a simulation program in accordance with a specific embodiment of the invention.

FIG. 9 is a flow that can be implemented by at least a simulation program in accordance with a specific embodiment of the invention. Referring back to FIG. 1, simulation block 152 can—in whole or in part—implement the following methods. In one embodiment, flow 900 forms flux paths in a rotor-stator structure for, among other things, producing torque through the magnetic interaction of a rotor structure and a field pole structure. At 902, flow 900 forms a first magnetic flux path by generating an amp-turn magnetic flux in a first field pole member, the amp-turn magnetic flux traversing in substantially a straight line from a first flux interaction region at one end of the first field pole member to a second flux interaction region at the other end of the first field pole member. Note that in at least one embodiment, the flux interaction regions can be modeled to contain magnet material and may or may not contain magnetically permeable material. Further, flow 900 continues so that a portion of the amp-turn magnetic flux flows into a first flux interaction region of a second field pole member, whereby the amp-turn magnetic flux traverses in a straight line, or in substantially a straight line, from the first flux interaction region at one end of the second field pole member to a second flux interaction region at the other end of the second field pole member. Flow 900 can include receiving the portion of the amp-turn magnetic flux into the flux interaction region of the first flux interaction region of the first field pole member at 902, thereby forming the first magnetic flux path, which is a closed magnetic path.

At 904, flow 900 forms a second closed magnetic flux path by generating a permanent magnet flux via the first and the second field pole members through the poles of a first permanent magnet and a second permanent magnet each located in proximity to the flux interaction regions of the field poles, the magnets being located near the ends of the field pole members. The permanent magnet flux can be modeled to traverse air gaps formed between magnet surfaces of either the first permanent magnet or the second permanent magnet and either the first and second flux interaction regions. Generally, the polarities of the permanent magnets can be substantially aligned with each other in planes that contain an axis of rotation. In some cases, the polarities can be modeled to be in substantially opposite in direction.

At 906, flow 900 magnetically couples the magnets and field pole members at the flux interaction regions. In one embodiment, at least the second closed magnetic flux traverses air gaps that are at an inclined (e.g., an acute) angle with respect to an axis of rotation. In another embodiment, the air gaps can be of uniform width, w, as shown in FIG. 3. In yet another embodiment, the air gaps can be coextensive with the surface of cylindrical magnet surfaces. Note that the permanent magnets can be mechanically joined by a shaft that is centered on the axis of rotation to form a rotor structure. A number of the field pole members can be mechanically joined by supporting elements which together forms a field pole structure positioned generally concentric to the axis of rotation and thereby also concentric to the rotor structure. At 908, a performance characteristic can be determined. For example, a torque, as a performance characteristic, can be produced between the rotor structure and the field pole structure by the interaction of the flux in the first magnetic path and the flux in the second magnetic path. In various embodiments, the above-described flow can be implemented in software, hardware or the combination thereof. At 908, a motor design can be validated by confirming that a design of a motor operates to achieve a desired performance characteristic. As such, a designer can determine the dimensions of the simulated motor and use those dimensions to produce motors that will have functionality that approximates that of the simulated motor of flow 900, for example.

Figure 10:
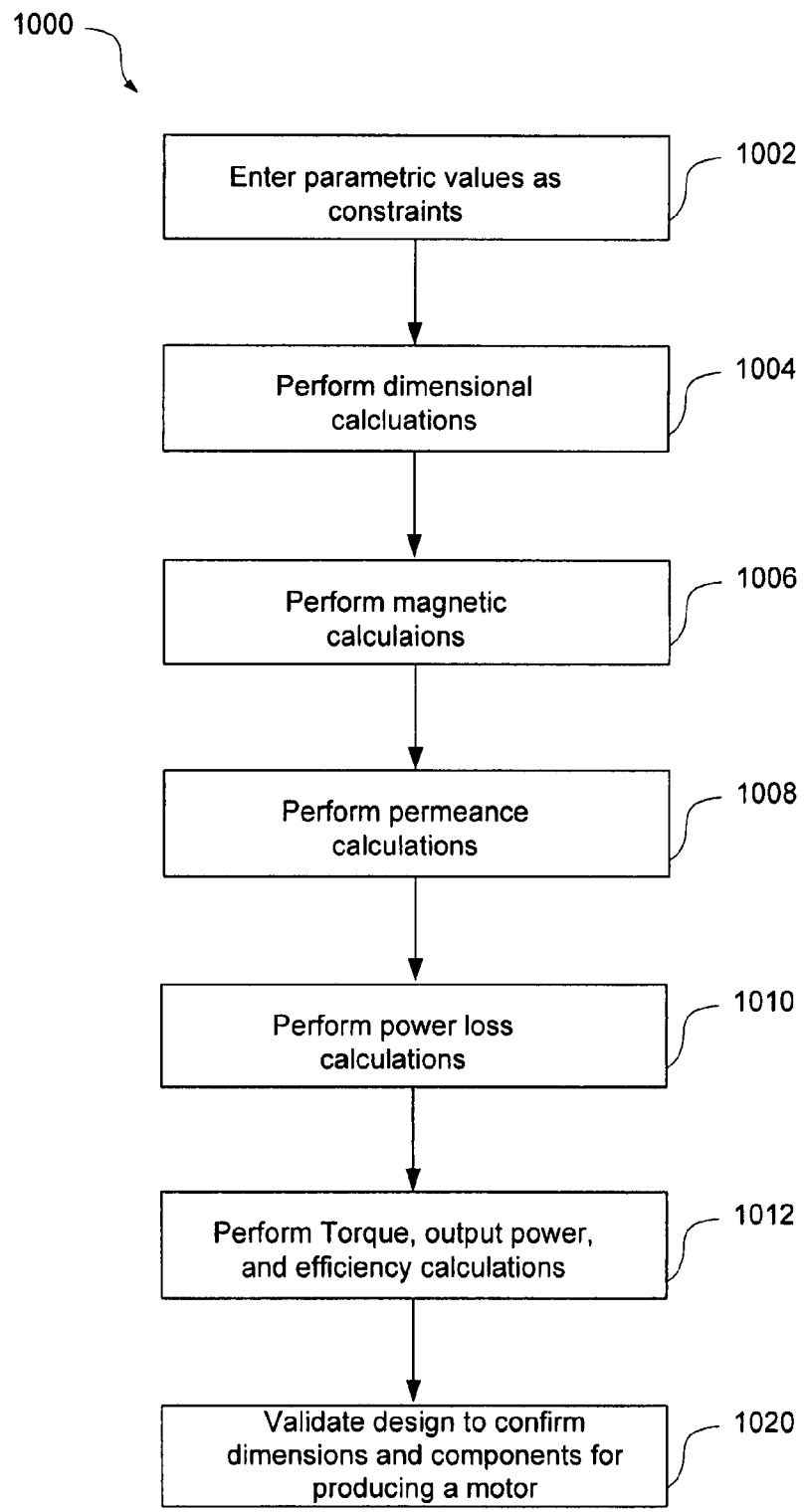
FIG. 10 is a flow that can be implemented by at least a design and/or simulation program in accordance with a specific embodiment of the invention.

FIG. 10 is a flow that can be implemented by at least a design and/or simulation program in accordance with a specific embodiment of the invention. Flow 1000 can be implemented in software, in hardware, or a combination thereof, to predict static performance of a motor that includes, for example, conical magnets. At 1002, a designer or a design program can use one or more of the following parameters as constraints with which to design a motor: an outside dimension of motor case (e.g., having a square shape viewed from the shaft end), a shaft diameter, magnet cone angle relative to the axis, minimum wall radius at the small end of a conical magnet, rotational velocity for a computer simulation, an equivalent number of "on" poles, an assembly peripheral packing factor of field poles with wound coils, a load line [e.g., the ratio B/H, in CGS units], Br of a selected magnet material, a recoil permeance of a selected magnet material, an air gap distance between a magnet pole surface and the facing pole shoe surface, a leakage factor (average) for magnet alone, acceptable ranges of flux density for various performance characteristics (such as a maximum torque, a maximum limit or range for current density, a number of amp-turns for a computer iteration), a wire size, coil axial length, and the like.

At 1004, a design program can perform dimensional calculations to determine the physical dimensions as structural/operational characteristics, at least in one embodiment, for one or more of the following when designing a motor: an end-view cross-sectional area of a wound field pole with coil, an upper limit of the radius of a large end of a conical magnet, a defined radius of a small end of the conical magnet, an axial length of the conical magnet, a surface area of a magnet, including conical and cylindrical magnets, a volume for a magnet, a gap area of an active field pole face, a coil wall thickness (which can be iterated to determine an optimal thickness), a field pole area perpendicular to or substantially perpendicular to a flux path segment (which can be iterated to determine an optimal area), a length of a field pole member, a volume of field pole core, and the like.

At 1006, a design program can perform magnetic calculations to determine operational attributes as structural/operational characteristics, at least in one embodiment, for one or more of the following when designing a motor: an operating point, Bd and/or Hd, of a magnet, an expected average flux density in an air gap, and the flux delivered by a magnet pole region to a facing field pole-face when facing that pole. At 1008, a design program can perform permeance calculations to determine structural/operational characteristics, at least in one embodiment, for one or more of the following when designing a motor: permeance of the magnetic circuit, permeance of an active field pole, permeance of an air gap at an active field pole face, permeance of leakage around a coil, permeance of a gap between field pole cores, a magnetic flux in the magnetic circuit, flux density (e.g., peak) in the field pole cores, and the like.

At 1010, a design program can perform power loss calculations to determine structural/operational characteristics, at least in one embodiment, for one or more of the following when designing a motor: number of turns in a coil, wire length, coil resistance, current in the coil, a power loss due to $I2\times(R+X)$, eddy current losses, skin depth of coil winding, power losses due to a specific field pole material at frequency and an applied flux density, total power losses, and the like. At 1012, a design program can determine torque, output power, and efficiency as performance characteristics, at least in one embodiment, such as one or more of the following: a peak output torque, a peak output power, an operating torque, an operating power losses, an operating output power, an efficiency at operating point, a peak efficiency condition, an expected heat dissipation, and the like. At 1014, a design program can validate a motor design to confirm dimensions and components for producing a motor. Thus, a designer can use the validated dimensions to approximate the simulated performance for manufacturing a motor or any other electrodynamic machine.

In at least one embodiment, the above-described pole faces and/or surfaces of the magnets can be contoured to have surface portions that are coextensive with arcs (or any other curvilinear shape) that have radii each having a radial length, whereby the radial lengths can differ from distances between the surface portions to the axis of rotation. The radial lengths and the distances between the surface portions to the axis are determined in planes that are perpendicular to the axis of rotation. In one embodiment, the surface of a pole face can include an arc having a radius referenced from a center point that excludes the axis, whereby a plane perpendicular to the axis of rotation includes the arc and the center point. In another embodiment, the surface of a magnet (e.g., a pole for a region of predetermined magnetization) can include an arc having a radius referenced from a center point that excludes the axis, whereby a plane perpendicular to the axis of rotation includes the arc and the center point. In various embodiments, either the pole faces or the surfaces of the magnets, or both, can have the same or different center points, and, further, those center points can include or exclude the axis of rotation. In one embodiment, at least one of the magnet surfaces can include multiple magnetic regions having substantially flat surfaces, whereby the multiple magnetic regions are positioned about a center point (excluding the axis) to approximate an arc.

In various embodiments, rotor-stator structures and electrical motors can be designed such that their functionalities can be simulated and modeled using computing devices. As such, at least an embodiment of the invention relates to a computer-readable medium having computer code thereon for performing various computer-implemented operations, such as modeling the conversion of electrical energy to mechanical torque (or the generation of electrical energy from mechanical torque). In particular, control strategies of the invention may be implemented in software associated with a processor. The media and computer code may be those specially designed and constructed for the purposes of the present invention, or they may be of the kind well known and available to those having skill in the computer software arts. Examples of computer-readable media include hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions. Further, other embodiments of the invention include motors using rotor-stator structures of the invention that are electrically driven by well known drive technology, as would be appreciated by those ordinarily skilled in the art.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000), "General Motor Terminology," as defined by the Small Motor and Motion Association ("SMMA"), and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to a motor, the discussion is applicable to all electrodynamic machines, such as a generator. As another example, consider that although the above description of the various embodiments describe a non-rotating stator structure in which there is a rotating shaft and attached rotor structure, the shaft can be held rigid in other embodiments while the stator structure is configured to rotate. Further, at least a subset of the various above-described embodiments can apply to the modeling of linear and rotary motors implementing rotor-stator structures described herein and incorporated by reference.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A method for designing a rotor-stator structure for an electrodynamic machine, the method comprising:
    selecting active field pole members including coils at least one of which has a coil length parallel to an axis of rotation, selecting said active field pole members comprising:
    selecting pole faces to confront conical surfaces of rotors disposed axially from each other, selecting said pole faces comprising:
        determining a flux in a coil region of an active field pole member to produce a value of torque, said coil region being disposed within said coil length;
        selecting a magnet material to produce a flux density at an air gap formed between a surface of said magnet material and a pole face of said active field pole member;
        calculating, in a processor, a surface area of said pole face at which said flux density of said magnet material provides for said flux in said coil region to approximate said value of torque; and
        determining a non-orthogonal angle at which to orient said pole face relative to said axis of rotation to establish said surface area for said pole face; and
    sizing said coil length while maintaining a cross-sectional area associated with said active field pole members to adjust said value of torque as one or more performance characteristics.

2. The method of claim 1 wherein selecting said active field pole members comprises:
    arranging said active field pole members in an arrangement having said cross-sectional area,
    wherein said arrangement of said active field pole members is coaxial to the axis of rotation.

3. The method of claim 2 wherein arranging said active field pole members in said arrangement further comprises:
    forming a stator assembly.

4. The method of claim 1 wherein selecting said active field pole members comprises:
    selecting contoured pole faces associated with said active field pole members.

5. The method of claim 1 wherein sizing said coil length further comprises:
    adjusting a motor efficiency value representing a motor efficiency as said performance characteristic.

6. The method of claim 1 wherein sizing said coil length further comprises:
    adjusting a motor constant value representing a motor constant, Km, as said performance characteristic.

7. The method of claim 1 wherein sizing said coil length further comprises:
    adjusting a torque value representing said value of torque as said performance characteristic while maintaining an input power.

8. The method of claim 1 wherein sizing said coil length further comprises:
    sizing said coil length to form a first size to establish one value of said one or more performance characteristics;
    sizing said coil length to form a second size to establish another value of one or more performance characteristics; and
    implementing a magnet with either said first size or said second size of said coil length.

9. The method of claim 1 wherein selecting said active field pole members further comprises:
    selecting contoured pole faces to confront at least a portion of a conical magnet.

10. The method of claim 1 wherein selecting said active field pole members further comprises:
    selecting contoured pole faces to confront at least a portion of a cylindrical magnet.

11. The method of claim 1 further comprising:
    adjusting the length of one or more field pole members.

12. The method of claim 1 wherein sizing said coil length further comprises:
    maintaining a wire diameter for said coil.

13. The method of claim 1 wherein sizing said coil length further comprises:
    maintaining a coil diameter for said coil.

14. The method of claim 1 wherein said cross-sectional area is coextensive with a diameter of a stator assembly.

15. A non-transitory computer-readable medium for designing a rotor-stator structure for an electrodynamic machine, the computer-readable medium, comprising executable instructions to:
    select active field pole members including coils at least one of which has a coil length parallel to an axis of rotation;
    select pole faces to confront conical surfaces of rotors disposed axially from each other, selecting said pole faces comprising:

determine a flux in a coil region of an active field pole member to produce a value of torque, said coil region being disposed within said coil length;

select a magnet material to produce a flux density at an air gap formed between a surface of said magnet material and a pole face of said active field pole member;

calculate, in a processor, a surface area of said pole face at which said flux density of said magnet material provides for said flux in said coil region to approximate said value of torque; and determine a non-orthogonal angle at which to orient said pole face relative to said axis of rotation to establish said surface area for said pole face; and size said coil length while maintaining a cross-sectional area associated with said active field pole members to adjust said value of torque as one or more performance characteristics.

16. The computer-readable medium of claim 15 wherein said executable instructions to select said active field pole members comprise executable instructions to:

arrange said active field pole members in an arrangement having said cross-sectional area, wherein said arrangement of said active field pole members is coaxial to the axis of rotation.

17. The computer-readable medium of claim 16 wherein said executable instructions to arrange said active field pole members in said arrangement further comprises executable instructions to:

form a stator assembly.

18. The computer-readable medium of claim 15 wherein said executable instructions to select said active field pole members comprise executable instructions to:

select contoured pole faces associated with said active field pole members.

19. The computer-readable medium of claim 15 wherein said executable instructions to size said coil length further comprise executable instructions to:

adjust a motor efficiency value representing a motor efficiency as said performance characteristic.

20. The computer-readable medium of claim 15 wherein said executable instructions to size said coil length further comprise executable instructions to: adjust a second motor constant value representing a motor constant, Km, as said performance characteristic.

21. The computer-readable medium of claim 15 wherein said executable instructions to size said coil length further comprise executable instructions to:

adjust a torque value representing said value of torque as said performance characteristic while maintaining an input power.

22. The computer-readable medium of claim 15 wherein said executable instructions to size said coil length further comprise executable instructions to:

size said coil length to form a first size to establish one value of said one or more performance characteristics;

size said coil length to form a second size to establish another value of said one or more performance characteristics; and implement a magnet with either said first size or said second size of said coil length.

23. The computer-readable medium of claim 15 wherein said executable instructions to select said active field pole members comprise executable instructions to:

select contoured pole faces to confront at least a portion of a conical magnet.

24. The computer-readable medium of claim 15 wherein said executable instructions to select said active field pole member comprise executable instructions to:

select contoured pole faces to confront at least a portion of a cylindrical magnet.

25. The computer-readable medium of claim 15 further comprising executable instructions to:

adjust the length of one or more field pole members.

26. The computer-readable medium of claim 15 wherein said executable instructions to size said coil length further comprise executable instructions to:

maintain a wire diameter for said coil.

27. The computer-readable medium of claim 15 wherein said executable instructions to size said coil length further comprise executable instructions to:

maintain a coil diameter for said coil.

28. The computer-readable medium of claim 15 wherein said cross-sectional area is coextensive with a diameter of a stator assembly.

* * * * *